(12) United States Patent
Maes

(10) Patent No.: US 8,879,547 B2
(45) Date of Patent: Nov. 4, 2014

(54) TELEPHONY APPLICATION SERVICES

(75) Inventor: Stéphane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 288 days.

(21) Appl. No.: 12/791,129

(22) Filed: Jun. 1, 2010

(65) Prior Publication Data
US 2011/0134804 A1 Jun. 9, 2011

Related U.S. Application Data

(60) Provisional application No. 61/183,439, filed on Jun. 2, 2009.

(51) Int. Cl.
| | | |
|---|---|---|
| H04Q 11/00 | (2006.01) | |
| H04L 12/28 | (2006.01) | |
| H04L 12/66 | (2006.01) | |

(52) U.S. Cl.
USPC ............................ 370/359; 370/419; 370/463

(58) Field of Classification Search
USPC ................................. 370/359, 419, 463, 469
See application file for complete search history.

(56) References Cited

U.S. PATENT DOCUMENTS

| | | |
|---|---|---|
| 5,414,812 A | 5/1995 | Filip et al. |
| 5,613,060 A | 3/1997 | Britton et al. |
| 5,699,513 A | 12/1997 | Feigen et al. |
| 5,737,321 A | 4/1998 | Takahashi |
| 5,786,770 A | 7/1998 | Thompson |
| 5,850,517 A | 12/1998 | Verkler et al. |
| 5,867,665 A | 2/1999 | Butman et al. |
| 5,946,634 A * | 8/1999 | Korpela .................... 455/552.1 |
| 6,115,690 A | 9/2000 | Wong |
| 6,119,104 A | 9/2000 | Brumbelow |
| 6,128,645 A | 10/2000 | Butman et al. |
| 6,157,941 A | 12/2000 | Verkler et al. |
| 6,163,800 A | 12/2000 | Ejiri |
| 6,192,231 B1 | 2/2001 | Chapman et al. |
| 6,192,414 B1 * | 2/2001 | Horn ............................. 709/239 |
| 6,230,271 B1 | 5/2001 | Wadlow et al. |
| 6,272,556 B1 | 8/2001 | Gish |
| 6,275,857 B1 | 8/2001 | McCartney |
| 6,336,138 B1 | 1/2002 | Caswell et al. |

(Continued)

FOREIGN PATENT DOCUMENTS

| | | |
|---|---|---|
| EP | 2 034 748 A1 | 3/2009 |
| WO | WO 2007134468 A1 | 11/2007 |
| WO | 2008146097 | 12/2008 |

OTHER PUBLICATIONS

U.S. Appl. No. 11/024,160, filed Dec. 27, 2004, Maes.

(Continued)

*Primary Examiner* — Warner Wong
(74) *Attorney, Agent, or Firm* — Kilpatrick Townsend & Stockton LLP

(57) ABSTRACT

Telephony application services are provided through use of a service delivery platform (SDP) and by implementing a service-oriented architecture (SOA)-based approach. Various "widgets" of telephony functionality are selected, each widget providing functionality such as call forwarding, call blocking, conferencing, etc. These widgets provide not only call manipulation, but can provide the logic used to process a call. An application or application service thus can combine and/or compose these widgets as needed to provide telephony functionality.

15 Claims, 15 Drawing Sheets

(56) References Cited

U.S. PATENT DOCUMENTS

| | | |
|---|---|---|
| 6,374,305 B1 | 4/2002 | Gupta et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,633,560 B1 | 10/2003 | Albert et al. |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,868,413 B1 | 3/2005 | Grindrod et al. |
| 6,965,902 B1 | 11/2005 | Ghatate |
| 6,978,348 B2 | 12/2005 | Belknap et al. |
| 6,981,023 B1 | 12/2005 | Hamilton et al. |
| 6,985,939 B2 | 1/2006 | Fletcher et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,072,653 B1 | 7/2006 | Sladek et al. |
| 7,073,055 B1 | 7/2006 | Freed et al. |
| 7,089,317 B2 | 8/2006 | Jeyaraman et al. |
| 7,106,848 B1 | 9/2006 | Barlow et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 * | 11/2006 | Nair et al. .................. 455/432.1 |
| 7,143,094 B2 | 11/2006 | Arroyo et al. |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,272,625 B1 | 9/2007 | Hannel et al. |
| 7,281,029 B2 | 10/2007 | Rawat |
| 7,295,532 B2 * | 11/2007 | Haller et al. .................. 370/328 |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,443,972 B1 | 10/2008 | Barlow et al. |
| 7,444,620 B2 | 10/2008 | Marvin |
| 7,447,793 B2 | 11/2008 | Morioka |
| 7,448,022 B1 | 11/2008 | Ram et al. |
| 7,454,399 B2 | 11/2008 | Matichuk |
| 7,461,062 B2 | 12/2008 | Stewart et al. |
| 7,472,349 B1 | 12/2008 | Srivastava et al. |
| 7,478,416 B2 * | 1/2009 | Edson ............................ 725/78 |
| 7,519,076 B2 | 4/2009 | Janssen et al. |
| 7,580,994 B1 | 8/2009 | Fiszman et al. |
| 7,590,696 B1 | 9/2009 | Odell et al. |
| 7,617,521 B2 | 11/2009 | Maes |
| 7,630,953 B2 | 12/2009 | Stauber et al. |
| 7,660,297 B2 | 2/2010 | Fisher et al. |
| 7,676,813 B2 | 3/2010 | Bisset et al. |
| 7,702,792 B2 | 4/2010 | Shaffer et al. |
| 7,716,310 B2 | 5/2010 | Foti |
| 7,720,926 B2 | 5/2010 | Asahara |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,716 B2 | 1/2011 | Maes |
| 7,925,727 B2 | 4/2011 | Sullivan et al. |
| 7,933,397 B2 | 4/2011 | Jain |
| 8,023,971 B2 | 9/2011 | Egli |
| 8,032,920 B2 | 10/2011 | Maes |
| 8,036,362 B1 | 10/2011 | Skinner |
| 8,060,067 B2 | 11/2011 | Tarleton et al. |
| 8,068,860 B1 | 11/2011 | Midkiff |
| 8,073,810 B2 | 12/2011 | Maes |
| 8,090,848 B2 | 1/2012 | Maes |
| 8,114,555 B2 * | 2/2012 | Leonida et al. ................ 429/535 |
| 8,121,278 B2 | 2/2012 | Leigh et al. |
| 8,161,171 B2 | 4/2012 | Maes |
| 8,214,503 B2 | 7/2012 | Maes |
| 8,223,951 B1 | 7/2012 | Edelhaus et al. |
| 8,230,449 B2 | 7/2012 | Maes |
| 8,255,470 B2 | 8/2012 | Jackson et al. |
| 8,321,498 B2 | 11/2012 | Maes et al. |
| 8,321,594 B2 | 11/2012 | Maes et al. |
| 8,370,506 B2 | 2/2013 | Maes |
| 8,401,022 B2 | 3/2013 | Maes et al. |
| 8,458,703 B2 | 6/2013 | Maes |
| 8,505,067 B2 | 8/2013 | Maes |
| 8,533,773 B2 | 9/2013 | Maes |
| 8,539,097 B2 | 9/2013 | Maes |
| 8,543,665 B2 * | 9/2013 | Ansari et al. .................. 709/218 |
| 8,589,338 B2 | 11/2013 | Maes |
| 8,676,155 B2 | 3/2014 | Fan et al. |
| 2001/0010053 A1 | 7/2001 | Ben-Shachar et al. |
| 2001/0016880 A1 | 8/2001 | Cai et al. |
| 2001/0028649 A1 | 10/2001 | Pogossiants et al. |
| 2002/0002684 A1 | 1/2002 | Fox et al. |
| 2002/0087674 A1 | 7/2002 | Guilford et al. |
| 2002/0099738 A1 | 7/2002 | Grant |
| 2002/0101879 A1 | 8/2002 | Bouret |
| 2002/0104015 A1 | 8/2002 | Barzilai et al. |
| 2002/0111848 A1 | 8/2002 | White |
| 2002/0120729 A1 | 8/2002 | Faccin et al. |
| 2002/0143819 A1 | 10/2002 | Han et al. |
| 2002/0144119 A1 | 10/2002 | Benantar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0005034 A1 | 1/2003 | Amin |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0118167 A1 | 6/2003 | Sammon et al. |
| 2003/0120502 A1 | 6/2003 | Robb et al. |
| 2003/0131076 A1 | 7/2003 | Nelson et al. |
| 2003/0135553 A1 | 7/2003 | Pendakur |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0185233 A1 * | 10/2003 | Ji et al. .......................... 370/466 |
| 2003/0191769 A1 | 10/2003 | Crisan et al. |
| 2003/0191823 A1 | 10/2003 | Bansal et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0093593 A1 | 5/2004 | Jhanwar et al. |
| 2004/0100923 A1 * | 5/2004 | Yam .............................. 370/328 |
| 2004/0110493 A1 | 6/2004 | Alvarez et al. |
| 2004/0125758 A1 * | 7/2004 | Hayduk ....................... 370/310 |
| 2004/0128546 A1 | 7/2004 | Blakley et al. |
| 2004/0133627 A1 | 7/2004 | Kalyanaraman et al. |
| 2004/0139319 A1 | 7/2004 | Favazza et al. |
| 2004/0148334 A1 | 7/2004 | Arellano et al. |
| 2004/0153545 A1 | 8/2004 | Pandaya et al. |
| 2004/0161090 A1 | 8/2004 | Digate et al. |
| 2004/0162881 A1 | 8/2004 | Digate et al. |
| 2004/0176988 A1 | 9/2004 | Boughannam |
| 2004/0221005 A1 | 11/2004 | Albaugh et al. |
| 2005/0004974 A1 * | 1/2005 | Sharma et al. ................ 709/202 |
| 2005/0015340 A1 | 1/2005 | Maes |

(56) References Cited

U.S. PATENT DOCUMENTS

| | | |
|---|---|---|
| 2005/0021670 A1 | 1/2005 | Maes |
| 2005/0050194 A1 | 3/2005 | Honeisen et al. |
| 2005/0054287 A1 | 3/2005 | Kim |
| 2005/0068167 A1 | 3/2005 | Boyer et al. |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0112400 A1* | 5/2006 | Zhang et al. ............. 719/328 |
| 2006/0116912 A1 | 6/2006 | Maes |
| 2006/0117109 A1 | 6/2006 | Maes |
| 2006/0117376 A1 | 6/2006 | Maes |
| 2006/0136560 A1 | 6/2006 | Jiang |
| 2006/0143622 A1* | 6/2006 | Prabandham et al. ....... 719/328 |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0047534 A1 | 3/2007 | Hakusui |
| 2007/0061397 A1 | 3/2007 | Gregorat et al. |
| 2007/0071224 A1 | 3/2007 | Shtivelman et al. |
| 2007/0088836 A1 | 4/2007 | Tai et al. |
| 2007/0099613 A1 | 5/2007 | Burgan et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0117556 A1 | 5/2007 | Rogalski |
| 2007/0118618 A1 | 5/2007 | Kisel et al. |
| 2007/0118648 A1 | 5/2007 | Millefiorini et al. |
| 2007/0118662 A1 | 5/2007 | Vishwanathan et al. |
| 2007/0121539 A1 | 5/2007 | Kikuchi |
| 2007/0150480 A1 | 6/2007 | Hwang et al. |
| 2007/0150936 A1 | 6/2007 | Maes |
| 2007/0182541 A1 | 8/2007 | Harris et al. |
| 2007/0189466 A1 | 8/2007 | Croak et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0255662 A1 | 11/2007 | Tumminaro |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0043975 A1 | 2/2008 | Miloslavsky et al. |
| 2008/0049929 A1 | 2/2008 | Miloslavsky et al. |
| 2008/0080479 A1 | 4/2008 | Maes |
| 2008/0095326 A1 | 4/2008 | Qi et al. |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0147799 A1 | 6/2008 | Morris |
| 2008/0151768 A1 | 6/2008 | Liu |
| 2008/0151918 A1 | 6/2008 | Foti |
| 2008/0162637 A1 | 7/2008 | Adamczyk et al. |
| 2008/0168523 A1 | 7/2008 | Ansari et al. |
| 2008/0175251 A1 | 7/2008 | Oouchi et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0212762 A1 | 9/2008 | Gray et al. |
| 2008/0222694 A1 | 9/2008 | Nakae |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0253543 A1 | 10/2008 | Aharon |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0301135 A1 | 12/2008 | Alves et al. |
| 2008/0307108 A1 | 12/2008 | Yan et al. |
| 2009/0003362 A1 | 1/2009 | Pattabhiraman et al. |
| 2009/0006360 A1 | 1/2009 | Liao et al. |
| 2009/0015433 A1 | 1/2009 | James et al. |
| 2009/0022072 A1 | 1/2009 | Zhu et al. |
| 2009/0022286 A1 | 1/2009 | Brunson et al. |
| 2009/0034426 A1 | 2/2009 | Luft et al. |
| 2009/0061404 A1 | 3/2009 | Atwal et al. |
| 2009/0086950 A1 | 4/2009 | Vendrow et al. |
| 2009/0093240 A1 | 4/2009 | Lang |
| 2009/0106677 A1 | 4/2009 | Son et al. |
| 2009/0109959 A1 | 4/2009 | Elliott et al. |
| 2009/0112875 A1 | 4/2009 | Maes |
| 2009/0119303 A1 | 5/2009 | Rio et al. |
| 2009/0125595 A1 | 5/2009 | Maes |
| 2009/0132220 A1* | 5/2009 | Chakraborty et al. .......... 703/13 |
| 2009/0132717 A1 | 5/2009 | Maes |
| 2009/0154681 A1 | 6/2009 | Kung et al. |
| 2009/0185576 A1* | 7/2009 | Kisel et al. ................ 370/462 |
| 2009/0187919 A1* | 7/2009 | Maes ......................... 719/313 |
| 2009/0190603 A1 | 7/2009 | Damola et al. |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0222858 A1 | 9/2009 | Hjelm et al. |
| 2009/0228584 A1 | 9/2009 | Maes et al. |
| 2009/0306834 A1 | 12/2009 | Hjelm et al. |
| 2009/0328051 A1 | 12/2009 | Maes |
| 2010/0037157 A1* | 2/2010 | Chang et al. ................ 715/764 |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0091764 A1 | 4/2010 | Merino Gonzalez et al. |

(56) References Cited

U.S. PATENT DOCUMENTS

| | | | |
|---|---|---|---|
| 2010/0128696 A1 | 5/2010 | Fantini et al. | |
| 2010/0153865 A1* | 6/2010 | Barnes et al. | 715/762 |
| 2010/0185772 A1 | 7/2010 | Wang et al. | |
| 2010/0192004 A1* | 7/2010 | Bauchot et al. | 714/2 |
| 2010/0281488 A1 | 11/2010 | Krishnamurthy et al. | |
| 2011/0035443 A1 | 2/2011 | Jensen | |
| 2011/0125909 A1 | 5/2011 | Maes | |
| 2011/0125913 A1 | 5/2011 | Maes | |
| 2011/0126261 A1 | 5/2011 | Maes | |
| 2011/0134843 A1 | 6/2011 | Noldus et al. | |
| 2011/0142211 A1 | 6/2011 | Maes | |
| 2011/0145278 A1 | 6/2011 | Maes | |
| 2011/0145347 A1 | 6/2011 | Maes | |
| 2011/0182205 A1 | 7/2011 | Gerdes et al. | |
| 2011/0258619 A1 | 10/2011 | Wookey | |
| 2011/0280383 A1 | 11/2011 | Varga et al. | |
| 2012/0045040 A1 | 2/2012 | Maes | |
| 2012/0047506 A1 | 2/2012 | Maes | |
| 2012/0106728 A1 | 5/2012 | Ghaffari et al. | |
| 2012/0173745 A1 | 7/2012 | Maes | |

OTHER PUBLICATIONS

Andrews, Tony et al., Business Process Execution Language for Web Services, Version 1.1, BEA Systems, International Business Machines Corporation, SAP AG, Siebel Systems, May 5, 2003, 31 pages.

Burger, E. et al., "Deploying CCXML for Application-Layer Call Control," Aug. 2006, 11 pages.

International Search Report and Written Opinion of PCT/US2010/037074 mailed Jun. 1, 2011, 16 pages.

Kim et al., "Implementation of Third Party Based Call Control using Parlay Network API in SIP Environment," ICOIN 2003, LNCS 2662, 2003, pp. 416-425.

Liberty Architecture Overview, Liberty Alliance Project Version 1.1, Piscataway New Jersey, Jan. 15, 2003, 44 pages.

Maes, Stephane, Multi-modal Browser Architecture, Overview on the support of multi-modal browsers in 3GPP, IBM Research Mobile Speech Solutions and Conversational Multi-modal Computing, http://www.w3.org, accessed May 26, 2003, 25 pages.

Maes, Stephane, Multi-modal Web IBM Position W3C/WAP Workshop, IBM Research Human Language Technologies, http://www.w3.org, accessed May 26, 2003, 9 pages.

Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.

O'Doherty, Phelim, "JSLEE—SIP Servlet", <http://java.sun.com/products/jain/JSLEE-SIPServlet.pdf, 2003, 13 pages.

Parlay APIs 4.0, Parlay X Web Services White Paper, The Parlay Group, Parlay X Working Group, Dec. 16, 2002, 12 pages.

Policy-Based Management Tom Sheldon's Linktionary, http://www.linktionary.com/policy.html, accessed Aug. 2, 2004, 4 pages.

Romellini, C. et al., "CCXML: The Power of Standardization," Loquendo, Sep. 27, 2005, 7 pages.

Seely, Scott, "XML and Web Services Security: Understanding WS-Security", Microsoft Corporation, 2002, 11 pages.

Simpson et al., Java Product Review—Oracle EDA Suite, Dec. 4, 2006, Open Source Magazine, pp. 1-10.

Single Sign on Deployment Guide, Introduction to Single-Sign-On, Netscape 6 Documentation Training Manual http://developer.netscape.com/docs/manuals/security/SSO/sso.htm, accessed May 26, 2003, 5 pages.

Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html, accessed May 26, 2003, 7 pages.

The Parlay Group, "Specifications", <http://web.archive.org/web/20050114014707/www.parlay.org/specs/index.asp>, Jan. 14, 2005, 2 pages.

Thomas, Ann M., "Registering a Web Service in UDDI", SOA World Magazine, Sep. 26, 2003, 9 pages.

U.S. Appl. No. 11/848,347, filed Aug. 31, 2007, Advisory Action mailed Jul. 27, 2010, 3 pages.

U.S. Appl. No. 11/848,347, filed Aug. 31, 2007, Final Office Action mailed May 10, 2010, 15 pages.

U.S. Appl. No. 11/848,347, filed Aug. 31, 2007, Office Action mailed Oct. 29, 2009, 12 pages.

U.S. Appl. No. 11/848,347, filed Aug. 31, 2007, Office Action mailed Sep. 30, 2010, 19 pages.

U.S. Appl. No. 11/848,347, filed Aug. 31, 2007, Final Office Action mailed Mar. 7, 2011, 21 pages.

U.S. Appl. No. 11/848,347, filed Aug. 31, 2007, Advisory Action mailed May 23, 2011, 3 pages.

U.S. Appl. No. 11/877,129, filed Oct. 23, 2007, Advisory Action mailed Jun. 3, 2010, 2 pages.

U.S. Appl. No. 11/877,129, filed Oct. 23, 2007, Final Office Action mailed Mar. 29, 2010, 17 pages.

U.S. Appl. No. 11/877,129, filed Oct. 23, 2007, Notice of Allowance mailed Aug. 5, 2010, 6 pages.

U.S. Appl. No. 11/877,129, filed Oct. 23, 2007, Office Action mailed Sep. 28, 2009, 15 pages.

U.S. Appl. No. 11/926,738, filed Oct. 29, 2007, Final Office Action mailed Jun. 29, 2010, 12 pages.

U.S. Appl. No. 11/926,738, filed Oct. 29, 2007, Office Action mailed Feb. 24, 2010, 12 pages.

U.S. Appl. No. 11/926,738, filed Oct. 29, 2007, Advisory Action mailed Sep. 3, 2010, 2 pages.

U.S. Appl. No. 11/926,738, filed Oct. 29, 2007, Office Action mailed Nov. 10, 2010, 12 pages.

U.S. Appl. No. 11/926,738, filed Oct. 29, 2007, Final Office Action mailed Mar. 17, 2011, 13 pages.

U.S. Appl. No. 11/926,738, filed Oct. 29, 2007, Advisory Action mailed May 25, 2011, 3 pages.

U.S. Appl. No. 11/943,101, filed Nov. 20, 2007, Advisory Action mailed Apr. 16, 2010, 3 pages.

U.S. Appl. No. 11/943,101, filed Nov. 20, 2007, Final Office Action mailed Feb. 2, 2010, 9 pages.

U.S. Appl. No. 11/943,101, filed Nov. 20, 2007, Office Action mailed Jul. 8, 2009, 9 pages.

U.S. Appl. No. 11/943,101, filed Nov. 20, 2007, Office Action mailed Aug. 27, 2010, 11 pages.

U.S. Appl. No. 11/943,101, filed Nov. 20, 2007, Final Office Action mailed Feb. 14, 2011, 11 pages.

U.S. Appl. No. 11/943,101, filed Nov. 20, 2007, Advisory Action mailed Apr. 28, 2011, 3 pages.

U.S. Appl. No. 11/951,500, filed Dec. 6, 2007, Advisory Action mailed Jun. 24, 2010, 2 pages.

U.S. Appl. No. 11/951,500, filed Dec. 6, 2007, Final Office Action mailed Mar. 30, 2010, 26 pages.

U.S. Appl. No. 11/951,500, filed Dec. 6, 2007, Office Action mailed Sep. 22, 2009, 24 pages.

U.S. Appl. No. 11/951,500, filed Dec. 6, 2007, Office Action mailed Sep. 1, 2010, 30 pages.

U.S. Appl. No. 11/951,500, filed Dec. 6, 2007, Final Office Action mailed Apr. 14, 2011, 33 pages.

U.S. Appl. No. 10/855,999, filed May 28, 2004, Advisory Action dated Feb. 16, 2010, 3 pages.

U.S. Appl. No. 10/855,999, filed May 28, 2004, Advisory Action dated Feb. 2, 2009, 3 pages.

U.S. Appl. No. 10/855,999, filed May 28, 2004, Final Office Action dated Nov. 19, 2008, 12 pages.

U.S. Appl. No. 10/855,999, filed May 28, 2004, Final Office Action dated Nov. 23, 2009, 19 pages.

U.S. Appl. No. 10/855,999, filed May 28, 2004, Office Action dated Apr. 15, 2009, 13 pages.

U.S. Appl. No. 10/855,999, filed May 28, 2004, Office Action dated May 1, 2008, 9 pages.

U.S. Appl. No. 10/855,999, filed May 28, 2004, Office Action dated Jun. 24, 2010, 20 pages.

U.S. Appl. No. 10/855,999, filed May 28, 2004, Final Office Action dated Jan. 5, 2011, 19 pages.

(56) References Cited

OTHER PUBLICATIONS

U.S. Appl. No. 10/855,999, filed May 28, 2004, Advisory Action dated Mar. 16, 2011, 3 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Final Office Action dated Sep. 27, 2010, 8 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005 Office Action dated Aug. 5, 2008, 18 pages.
U.S. Appl. No. 11/024,160, filed Dec. 27, 2004, Office Action dated Feb. 7, 2011, 11 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/024,160, filed Dec. 27, 2004, Final Office Action dated Jun. 1, 2011, 11 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 10, 2010, 18 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Advisory Action dated Jan. 18, 2011, 2 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 11/939,705, filed Nov. 14, 2007, Office Action mailed Oct. 4, 2010, 21 pages.
U.S. Appl. No. 11/939,705, filed Nov. 14, 2007, Final Office Action mailed Mar. 17, 2011, 21 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 12/019,335, filed Jan. 24, 2008, Office Action mailed May 23, 2011, 18 pages.
U.S. Appl. No. 12/364,642, filed Feb. 3, 2009, Office Action dated Dec. 20, 2010, 18 pages.
U.S. Appl. No. 11/357,653, filed Feb. 16, 2006, Office Action dated Jan. 20, 2011, 18 pages.
U.S. Appl. No. 12/544,459, filed Aug. 20, 2009, Office Action mailed Mar. 2, 2011, 10 pages.
U.S. Appl. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Final Office Action mailed Oct. 6, 2010, 20 pages.
U.S. Appl. No. 12/019,299, filed Jan. 24, 2008, Office Action mailed Mar. 31, 2010, 13 pages.
U.S. Appl. No. 12/019,299, filed Jan. 24, 2008, Office Action mailed Jan. 24, 2011, 16 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/OSI_model>, Sep. 7, 2005, 8 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Office Action mailed Jul. 28, 2011, 11 pages.
U.S. Appl. No. 11/951,500, filed Dec. 6, 2007, Advisory Action mailed Jul. 15, 2011, 3 pages.
U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 12/045,220, filed Mar. 10, 2008, Office Action dated Sep. 27, 2011, 20 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Advisory Action dated Sep. 16, 2011, 3 pages.
U.S. Appl. No. 11/357,653, filed Feb. 16, 2006, Final Office Action dated Aug. 2, 2011, 19 pages.
U.S. Appl. No. 12/544,459, filed Aug. 20, 2009, Notice of Allowance mailed Aug. 22, 2011, 8 pages.
U.S. Appl. No. 11/949,930, filed Dec. 4, 2007, Office Action mailed Sep. 29, 2011, 19 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.
U.S. Appl. No. 11/848,347, filed Aug. 31, 2007, Notice of Allowance mailed Mar. 2, 2012, 9 pages.
U.S. Appl. No. 11/951,500, filed Dec. 6, 2007, Office Action mailed Apr. 11, 2012, 6 pages.
U.S. Appl. No. 11/070,317, filed Mar. 1, 2005, Office Action dated Mar. 15, 2012, 10 pages.

(56) References Cited

OTHER PUBLICATIONS

U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/019,335, filed Jan. 24, 2008, Advisory Action mailed Feb. 27, 2012, 3 pages.
U.S. Appl. No. 12/544,484, filed Aug. 20, 2009, Advisory Action dated Feb. 9, 2012, 2 pages.
U.S. Appl. No. 11/949,930, filed Dec. 4, 2007, Notice of Allowance mailed Mar. 19, 2012, 19 pages.
U.S. Appl. No. 12/014,387, filed Jan. 15, 2008, Final Office Action mailed Apr. 5, 2012, 17 pages.
U.S. Appl. No. 12/018,718, filed Jan. 23, 2008, Final Office Action mailed Feb. 1, 2012, 30 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/943,101, filed Nov. 20, 2007, Notice of Allowance mailed Dec. 9, 2011, 7 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Advisory Action dated Oct. 12, 2011, 3 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 11/357,653, filed Feb. 16, 2006, Office Action dated Apr. 26, 2012, 18 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 13/416,413, filed Mar. 9, 2012, Office Action mailed Apr. 27, 2012, 11 pages.
U.S. Appl. No. 12/019,335, filed Jan. 24, 2008, Final Office Action mailed Jan. 14, 2014, 33 pages.
U.S. Appl. No. 11/969,343, filed Jan. 4, 2008, Notice of Allowance mailed Jan. 16, 2014, 6 pages.
U.S. Appl. No. 12/018,718, filed Jan. 23, 2008, Advisory Action mailed Nov. 15, 2013, 3 pages.
U.S. Appl. No. 13/029,219, filed Feb. 17, 2011, Advisory Action mailed Jan. 2, 2014, 3 pages.
U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/019,299, filed Jan. 24, 2008, Final Office Action mailed Aug. 15, 2012, 19 pages.
U.S. Appl. No. 13/416,413, filed Mar. 9, 2012, Notice of Allowance mailed Oct. 2, 2012, 5 pages.
U.S. Appl. No. 10/855,999, filed May 28, 2004, Non-Final Office Action dated Mar. 28, 2013, 42 pages.
U.S. Appl. No. 10/855,999, filed May 28, 2004, Advisory Action dated Mar. 18, 2011, 5 pages.
U.S. Appl. No. 11/070,317, filed Mar. 1, 2005, Notice of Allowance dated Oct. 19, 2012, 11 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 13/029,219, filed Feb. 17, 2011, Non-Final Office Action mailed Mar. 20, 2013, 65 pages.
U.S. Appl. No. 12/045,220, filed Mar. 10, 2008, Non-Final Office Action dated Oct. 7, 2013, 19 pages.
U.S. Appl. No. 11/357,653, filed Feb. 16, 2006, Non-final Office Action dated Jul. 11, 2013, 26 pages.
U.S. Appl. No. 11/357,653, filed Feb. 16, 2006, Final Office Action dated Nov. 26, 2013, 25 pages.
U.S. Appl. No. 12/014,387, filed Jan. 15, 2008, Notice of Allowance mailed Oct. 25, 2013, 17 pages.
U.S. Appl. No. 12/018,718, filed Jan. 23, 2008, Final Office Action mailed Sep. 10, 2013, 55 pages.
U.S. Appl. No. 12/949,183, filed Nov. 18, 2010, Advisory Action mailed Jun. 28, 2013, 3 pages.
U.S. Appl. No. 12/949,183, filed Nov. 18, 2010, Non-Final Office Action mailed Sep. 9, 2013, 18 pages.
U.S. Appl. No. 12/949,287, filed Nov. 18, 2010, Non-final Office Action mailed Aug. 8, 2013, 24 pages.
U.S. Appl. No. 12/949,287, filed Nov. 18, 2010, Final Office Action mailed Nov. 25, 2013, 25 pages.
U.S. Appl. No. 12/957,740, filed Dec. 1, 2010, Non-final Office Action mailed Aug. 15, 2013, 17 pages.
U.S. Appl. No. 13/029,219, filed Feb. 17, 2011, Final Office Action mailed Oct. 11, 2013, 22 pages.
U.S. Appl. No. 12/957,697, filed Dec. 1, 2010, Non-Final Office Action mailed Oct. 1, 2013, 10 pages.
U.S. Appl. No. 10/855,999, filed May 28, 2004, Final Office Action dated Nov. 18, 2013, 14 pages.
U.S. Appl. No. 12/949,183, filed Nov. 18, 2010, Final Office Action mailed Jan. 21, 2014, 19 pages.
U.S. Appl. No. 12/957,740, filed Dec. 1, 2010, Final Office Action mailed Feb. 19, 2014, 18 pages.
U.S. Appl. No. 13/029,226, filed Feb. 17, 2011, Final Office Action mailed Jan. 30, 2014, 17 pages.
3rd Generation Partnership Project 2, "Presence Service: Architecture and Functional Description", doc. No. 3GPP2X.S0027-001-0, published on Sep. 2004.
Day, et al., "RFC 2778, A Model for Presence and Instant Messaging", published on Feb. 2000, 12 pages.
U.S. Appl. No. 11/070,317, filed Mar. 1, 2005, Notice of Allowance dated Oct. 19, 2012, 2 pages.
U.S. Appl. No. 11/939,705, filed Nov. 14, 2007, Final Office Action mailed Dec. 5, 2012, 18 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.

(56) References Cited

OTHER PUBLICATIONS

U.S. Appl. No. 12/019,299, filed Jan. 24, 2008, Advisory Action mailed Oct. 29, 2012, 3 pages.
U.S. Appl. No. 12/019,299, filed Jan. 24, 2008, Office Action mailed Dec. 7, 2012, 21 pages.
U.S. Appl. No. 12/948,247, filed Nov. 17, 2010, Final Office Action mailed Feb. 11, 2013, 25 pages.
U.S. Appl. No. 12/948,450, filed Nov. 17, 2010, Office Action mailed Nov. 7, 2012, 48 pages.
U.S. Appl. No. 12/949,183, filed Nov. 18, 2010, Non-final Office Action mailed Nov. 16, 2012, 69 pages.
U.S. Appl. No. 12/949,287, filed Nov. 18, 2010, Non-final Office Action mailed Nov. 19, 2012, 70 pages.
U.S. Appl. No. 12/957,740, filed Dec. 1, 2010, Non-final Office Action mailed Oct. 17, 2012, 52 pages.
U.S. Appl. No. 12/957,740, filed Dec. 1, 2010, Final Office Action mailed Feb. 15, 2013, 25 pages.
U.S. Appl. No. 11/939,705, filed Nov. 14, 2007, Notice of Allowance mailed May 15, 2013, 92 pages.
U.S. Appl. No. 12/018,718, filed Jan. 23, 2008, Non-Final Office Action mailed Apr. 24, 2013, 114 pages.
U.S. Appl. No. 12/948,450, filed Nov. 17, 2010, Notice of Allowance mailed May 10, 2013, 28 pages.
U.S. Appl. No. 12/949,183, filed Nov. 18, 2010, Final Office Action mailed Apr. 17, 2013, 30 pages.
U.S. Appl. No. 12/949,287, filed Nov. 18, 2010, Final Office Action mailed Apr. 23, 2013, 28 pages.
U.S. Appl. No. 12/957,740, filed Dec. 1, 2010, Advisory Action mailed May 21, 2013, 13 pages.
U.S. Appl. No. 13/029,226, filed Feb. 17, 2011, Non-Final Office Action mailed May 28, 2013, 47 pages.
U.S. Appl. No. 11/123,468, Non-Final Office Action mailed on Jun. 10, 2014, 18 pages.
U.S. Appl. No. 12/019,335, Notice of Allowance mailed on Jun. 11, 2014, 7 pages.
U.S. Appl. No. 12/957,697, Non-Final Office Action mailed on Jul. 2, 2014, 9 pages.

* cited by examiner

Telephony/Telecom AS in IMS

Deployment (Cluster)

TELEPHONY APPLICATION SERVICES

CROSS-REFERENCE TO RELATED APPLICATIONS

This application is related to and claims the benefit of U.S. Provisional Patent Application No. 61/183,439 filed Jun. 2, 2009 by Maes and entitled "Telephony Application Services" of which the entire disclosure is incorporated herein by reference for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

With the development and proliferation of technologies such as Voice Over Internet Protocol (VoIP), an increased amount of telephony and related functionality is being made available over electronic networks such as the Internet. A telephony application can provide functionality over an electronic network that is common for traditional public switched telephone networks ("PSTNs"). Such functionality can include call forwarding, voice mail, conference calls, call blocking, televoting, call screening, telephone number portability, toll free calls and Freephone, prepaid calling, account card calling, virtual private networks (e.g. family group calling or enterprise "telephony" networks on PSTN), Centrex service (virtual private branch exchange (PBX)), private number plans (with numbers remaining unpublished in directories), short numbers and short codes, Universal Personal Telecommunication service (a universal personal telephone number), mass-calling services, prefix free dialing from cellphones abroad, seamless multimedia messaging service (MMS) access from abroad, reverse charging, home area discounts, premium rate calls, call distribution based on various criteria associated with a call, location based routing, time based routing, proportional call distribution (e.g. between two or more call centers or offices), and call queueing.

The functionality can be implemented in what is known in the industry as an Intelligent Network (IN). The Intelligent Network can use a variety of protocols, sometimes using a layered approach where the application layer is referred to as the Intelligent Networks Application Part (INAP), and sometimes using a less-layered protocol such as the Transaction Capabilities Application Part (TCAP). One standard for the IN protocols is the Customized Applications for Mobile networks Enhanced Logic (CAMEL), which allows increased functions for mobile phones. A Camel Application Part (CAP) can be layered on top of TCAP so that additional functions can be added to TCAP.

For European Telecommunications Standards Institute (ETSI) Wireline or old wireless networks, the following protocols are used: INAP, INAP Capability Set One (CS-1), INAP CS-1+ (an Ericsson variant), and SINAP (a Siemens variant). For North America, the Advanced Intelligent Network (AIN) is often used by carriers such as Qwest Communications, AT&T, EMBARQ® Wireless, and Rogers Communications. For Global System for Mobile communications (GSM) and Universal Mobile Telecommunication Systems (UMTS), the following protocols are typically used: CAP v1 to v4, INAP CS-1+, and SINAP 5m/7m. For networks using wireless code division multiple access (CDMA)/1x, Wireless Intelligent Networking (WIN) phase 1 (IS-771) and WIN phase 2 (IS-826) are often used. Second and third tier operators, operating in locations such as Mexico and Brazil, sometimes do not yet have a fully capable Intelligent Network; therefore, Integrated Services digital network User Part (ISUP) and Telephone User Part (TUP) protocols are also relevant in those localities.

A Service Control Point (SCP) typically is used to carry out the above and other functions that are not directly related to the routing of messages through the network. An SCP allows control at the service level of a network so that a service logic can drive the protocol to provided one of the services above. In general, the service logic is protocol specific and developed and executed directly as a manipulation of the protocol specific exchanges. The service logic is built for one specific IN (i.e. a well-defined protocol). In integrated telephone networks, these servers are mostly implemented as functions in the telephone exchange, but in more open networks such as Internet protocol (IP) telephony networks based on the SIP (session initiation protocol) protocol, Next Generation Networks (NGN), and Internet protocol Multimedia Subsystem (IMS), these are often separate computers which comprise the server.

In one approach, an SCP server supports the execution of service logic of applications such as call processing and routing, call-termination, messaging, and subscriber-independent, or subscriber-dependent, applications. The SCP includes service logic which implements the behavior desired by the operator, i.e., the services. During logic processing, additional data and capabilities required to process a call may be obtained from the Service Control Function (SCF). Examples of the applications provided on an SCP (as service logic) include such capabilities as local number portability, free-call routing resolution, conference bridge services, and unified messaging. The application/telephony service can be provided by service chaining on calls (incoming or outgoing).

Telephony applications (i.e. telephony/IN/PSTN service on service control points) are generally one of two types: those that are signaling only, and those that involve media manipulation. The former are often related to a routing resolution, including functionality such as local number portability, free-call routing, and other services where the dialed number must be translated to a routable address. Examples involving media manipulation include conference bridge applications, interactive voice response (IVR), etc., which are services with which many business professional are familiar. The call steps for such an example include the following. A user calling in on a pre-published number. The dialed number is translated into an IP address and named the endpoint of the application server, and the call is routed to that endpoint. The application server connects to the media server, instructing the media server to play a greeting and collect the conference number. The media server returns a conference number, and the application server instructs the media server to play a prompt to collect the authorization number. If the digits collected are correct, the application server tells the media server to move this call to a particular conference bridge.

Another example is a prepaid SCP in which the service is a prepaid service for a call or messaging. In such a service, the system checks the user's subscription and also manages the user's ratings and balances.

Such approaches, however, retain aspects of the PSTN versions but do not take full advantage of the new electronic environment.

BRIEF SUMMARY OF THE INVENTION

Embodiments in accordance with the present disclosure relate to providing telephony application services through the use of a service delivery platform (SDP) and a service-oriented architecture (SOA)-based approach. Various "widgets" (i.e. SOA services) including but not limited to telephony functionality, each providing discrete functionality such as call forwarding, call initiation, etc. are combined and/or composed into an application. The widgets provide multimedia session or call manipulation as well as logic used to process a multimedia session or call or set of calls or sessions between multiple users and access information about the user, manipulate that information (e.g. subscribe or charge), and message between users. An application/telephony service can be built by composing the widgets as needed to provide the desired telephony functionality/IN. The application/telephony service can also be used to debug the application. The widgets also can provide functionality for a single application that services disparate networks at the same time. Note also that calls should be interpreted as any media type or multimedia session or messaging. This can include video, video and voice, video and/or voice and data, etc.

One embodiment relates to a platform for providing network-based telephony functions as application/services. The platform includes at least one processor, a memory operatively coupled to the at least one processor, and a plurality of widgets executing on the at least one processor. The widgets each have a reusable function for a telecommunications network application, in which the plurality of widgets are enabled to execute on more than one network technology such that a function of a widget is available on a first network through an application programming interface (API) function call and on a second network through a second API call.

Another embodiment relates to a computer-implemented method for providing network-based telephony functions as application services. The method includes executing on a processor a plurality of widgets on at least one processor, the widgets each having a reusable function for a telecommunications network application, accessing from a memory operatively coupled to the processor one of the widgets from a first network through a first application programming interface (API) function call, and accessing using the processor one of the widgets from a second network through a second API call. The first and second networks utilize different protocols.

Yet other embodiments relate to machine-readable tangible storage media which employ or store instructions for the method described above.

Another embodiment is a computer-implemented method for implementing telephony services. The method includes executing a first widget on a processor, the first widget having a reusable function for a telecommunications network application, executing a second widget on the processor, the second widget having a reusable function for the telecommunication network application, and combining the widgets, using the processor, such that the widgets are executed in one application. The method further includes providing the functions as telephony services on a network, in which the widgets are enabled to execute on more than one network technology such that a function of each widget is available on a first network through an application programming interface (API) function call and on a second network through a second API function call.

Yet another embodiment is an telephony application server in a deployed system. The deployed system includes a telephony application server (AS), an administration portal operatively connected with the telephony AS, an operator portal operatively connected with the telephony AS, and an end user portal operatively connected with the telephony AS. The deployed system also includes a charging function server operatively connected with the telephony AS, and a call detail record (CDR) server operatively connected with the telephony AS. The telephony AS is deployed to interface with a public switched telephone network (PSTN) gateway, an emergency call center, a charging function, and a lawful interception server.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Figure 1A:
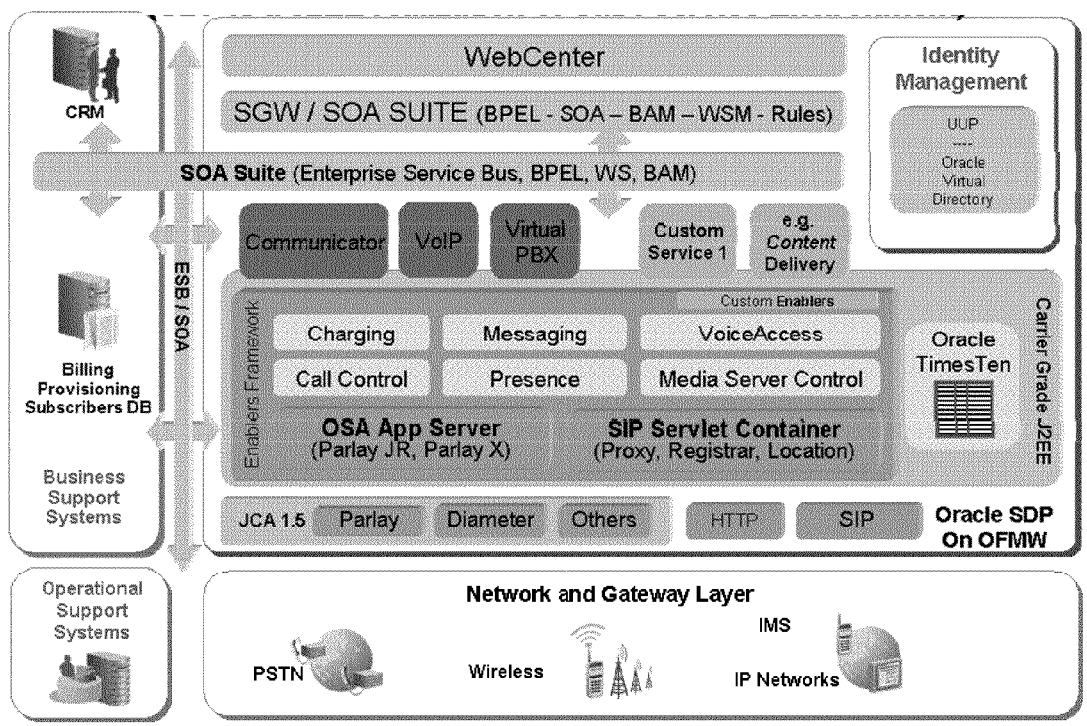
FIGS. 1(a) and 1(b) illustrate a service delivery platform (SDP)-based implementation that can be used in accordance with one embodiment.

Systems and methods in accordance with various embodiments overcome the aforementioned and other deficiencies in existing approaches to electronic network-based telephony systems by providing a platform for developing and utilizing telephony functions as application services.

An approach to providing telephony application services in accordance with one embodiment takes advantage of the fact that various services can be provided through use of a service delivery platform (SDP) and by implementing a service-oriented architecture (SOA)-based approach. Further information about a service delivery platform and SOA-based approaches is detailed in co-pending U.S. patent application Ser. No. 11/357,653, filed Feb. 16, 2006, entitled "Factorization of Concerns to Build a SDP (Service Delivery Platform)" (pending examination) as well as U.S. patent application Ser. No. 12/019,335, filed Jan. 24, 2008, entitled "Integrating Operational and Business Support Systems with a Service Delivery Platform" (pending examination) each of which is hereby incorporated herein by reference. As discussed in these references, an SDP implementation can take advantage of various enablers to provide some reusable functionality such as a call control enabler which enables call control functions to be performed and abstracts these functions from the underlying network. A media server enabler allows media server functionality, such as deriving a conferencing function or streaming functionality, to be provided independent of how the functionality is actually realized. An SDP also can include an enabler such as a voice access enabler that allows voice dialog to be added to an application.

An SDP is not absolutely necessary, as widgets that are built over different networks are also suitable. Also, the use of enablers is not necessary to carry out the invention. Nothing shall be construed in this application to restrict the invention to embodiments having an SDP and/or enablers.

Systems and methods in accordance with various embodiments, however, take this concept to the next level. The approach described above can take advantage of components such as application programming interfaces (APIs) to set up a call between two endpoints, such as two users or a user and a device, or to perform other functions such as connecting five people in a conference call or processing multimedia sessions or receiving call notifications.

Various advantages are obtained by instead defining "widgets" of multimedia session, e.g., call, functions including but not limited to telephony functionality. Each widget can provide a function such as, for example, call or multimedia session forwarding, call blocking, emergency call initiation, conferencing, call hunting, messaging, charging profile, etc. Each widget can be a portion of code or light application that sits above the call control enabler of the SDP to provide telephony functionality or other multimedia session functions. These widgets thus can not only provide session manipulation, but can provide logic that can be used to process a session and other network (e.g. IN) functions, etc. The widgets can also provide logic for media (and multimedia) control, messaging, charging, and access to user details.

An application or service thus can combine these widgets to provide multimedia, telephony and other IN functionality. For example, an application can utilize a set of widgets to authenticate a sender of the communication (i.e. a subscriber based on a) credentials, b) profile (e.g. pre-paid or post paid, corporate, gold, regular, etc.) or c) standing (e.g. bill/account balance and bill payment/settlement status) and determine the task that is desired for the communication (e.g. based on the subscription profile, such as what services, settings, and preferences have been set for the subscriber). After determining this information, the logic in the widgets can be used to determine how to process the communication, such as to place a call in voicemail or conference, page an associated recipient, send a message, charge for a service, initiate a multimedia session etc.

An implementation of telephony application services thus can utilize the widgets as building blocks to do business signaling, allow for the abstraction of the signaling and base signaling. Once this is provided, a wide variety of applications can be built to perform functions such as multimedia and call forwarding, call blocking, call intercepting, etc. The widgets can be composed as necessary using the SDP to provide a full fledged telephony application or application service. For example, a VoIP application can be created that determines, based upon various factors, where to forward a call, such as may be based on current user presence information, user preferences, etc. In another example, a private branch exchange (PBX) application can be created that allows a user to, in a real-time or in a pre-programmed fashion, decide where calls should be forwarded, etc. The composition can be accomplished using any appropriate technology, such as Java or BPEL (Business Process Execution Language), as described for example in the reference incorporated above. These widgets can be composed to provide a new telephony or multimedia application or application service.

Thus, an implementation in accordance with one embodiment provides a set of widgets that can be composed to provide a telephony application or application service. The set of widgets can be abstracted from the technology of the underlying network (e.g., PBX, SIP over IMS, etc.) to not only expose the call control capability or media server capability, but other call-related functionality such as forwarding of a call, obtaining information about a call, authenticating a call, hunting for a target, checking for presence information, directing the call based on this information, etc. Full-fledged applications such as PBX applications then can be built through composition of the different individual widgets.

Such functionality today would be provided through proprietary implementations without reuse a) of the widgets b) across protocols c) of IT practices to compose widgets. The functions would not be presented as individual call processing widgets that can be composed at will to build an application. Using composed widgets provides advantages such as an ability to react very quickly on a call at that level with the right latency, etc., as it is not critical to talk to the application at the time of the call because the logic will be in place for the application to handle the call correctly.

Further, many existing application such as VoIP and virtual PBX applications utilize similar functionality, but these applications are built separately even in the same environment. Such an approach results in duplication of code, and thus a waste of resources and increased chance of error. Using approaches described herein, a component such as a call control enabler can be used to build the desired application using the primitive functions or widgets as a composition of those functions, in an appropriate environment such as Java or BPEL, for example.

An example implementation will now be described that focuses on specific technology and two particular aspects, including how to integrate to IMS or PSTN/IN features provided on SIP, as well as how to provide telephony application services if basic functions are provided such as VoIP, Virtual PBX, SCIM, SIP AS, presence, adapters to network, call control, media server control, voice access, media and multimedia applications (e.g. IPTV, Video, web conferencing, call, etc.) and messaging. It should be understood that these aspects are merely exemplary, and that a number of other components can be used, substituted, and/or combined to perform these and other tasks. Some of these are described and/or suggested elsewhere herein, as would be apparent to one of ordinary skill in the art in light of the specification and figures.

It is possible to implement a system where services can be deployed on many networks (legacy current, future, and variations) and have them co-exist. Examples for implementing such systems can be found, for example, in U.S. Pat. No. 7,167,705, entitled "Roaming Across Different Access Mechanisms and Network Technologies" incorporated herein by reference, as well as U.S. patent application Ser. No. 11/357,653, filed Feb. 16, 2006, which is cited above.

Figure 1B:
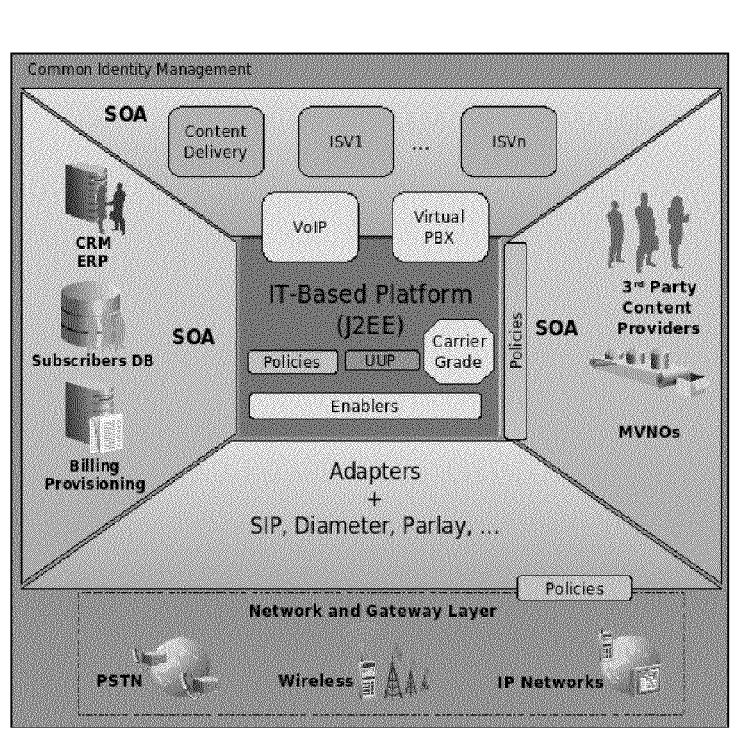

For example, FIGS. 1(a) and 1(b) illustrate an exemplary service delivery platform (SDP)-based architecture 100 that can be used in accordance with one embodiment. In the exemplary architecture 100 of FIG. 1(a), the SDP includes a horizontal, standards-based platform that abstracts the underlying network resources and follows a service-oriented architecture (SOA). Further information about such a service delivery platform is detailed in co-pending U.S. patent application Ser. No. 11/357,653, filed Feb. 16, 2006, cited above. In one embodiment, the SDP utilizes a horizontal SOA platform based on the Java 2 Platform, Enterprise Edition (J2EE). The SDP includes a converged container based on Java Specification Requests JSR 116/289 and JSR 32, which includes SOA SIP AS, OSA AS, and telephony AS as a J2EE converged container. The SDP also exposes mobile, voice, and other communications enablers.

In FIG. 1(b), the SDP configuration 150 is shown to implement the desired functionality on top of an underlying J2EE core provided by the application server. It is valuable to have a common identity managed across all the elements and the network, as well as a common view of all the data about a principal. A basic approach to providing a service delivery platform starts with a standards-based IT (Information Technology) platform (e.g., J2EE) and makes the platform carrier grade, and extends beyond Hypertext Transfer Protocol (HTTP) to protocols such as SIP, Diameter, and Parlay. To support the key protocols relevant to telecommunications, for example, the SDP can provide support for SIP/ISC, Diameter and Parlay Common Object Request Broker Architecture (CORBA) as well as adapters to messaging gateways. A standard approach can be used to build adapters to any other resource or protocol using JCA 1.5 (J2EE Connector Architecture 1.5), for example. Enablers are provided as reusable components that abstract the network resources and standard northbound interfaces. IT/SOA then can be used to provide services such as revenue generating services, utilizing SOA-based policies and business rules (e.g., from third parties). The platform then can provide for SOA-based integration of systems and services with the SDP. Exposure to third party content and a service provider can be achieved by SOA to expose, integrate and enforce policies. SOA also can be used to also support and rationalize policy management and evaluation throughout the service provider environment.

A set of enablers can be provided and implemented on SIP, Parlay, or IN protocols. These enablers can include, for example, a presence enabler that follows OMA SIP/SIMPLE Presence, XDM and RLS enabler specifications to provide an out of the box IMS presence server and SIP/SIMPLE presence server. It can also aggregate presence from other networks (e.g. network presence) and provide a northbound Parlay X interface for applications to use presence without participating in the presence network. Location data can be modeled as a presence attribute using an extensible presence data model. Enablers can, for example, allow for multimedia and multiparty call control over SIP (internet and IMS) as well as Parlay. A media server control enabler and voice access enabler that are the MRFC functions of MRF are able to control a wide variety of voiceXML servers, IVRs, announcement servers, and media servers (e.g. MSML, MSCML, MSCP, and MGCP). Protocols not available out of the box can be built on SIP AS or using JCA 1.5.

The present invention relates to the systems and methods described in U.S. Pat. No. 8,533,773, issued Sep. 10, 2013, titled "METHODS AND SYSTEMS FOR IMPLEMENTING SERVICE LEVEL CONSOLIDATED USER INFORMATION MANAGEMENT," which is hereby incorporated by reference. A software application can issue a command to create a new account in a unified user profile (UUP). The UUP component can cause a workflow to be launched, which may consist of one or more business processes which interact with an Operations Support System/Business Support System (OSS/BSS) to initiate an update to the OSS/BSS-owned repository (or repositories). Once the OSS/BSS repository is updated, the UUP continues such that the resulting updates in the OSS/BSS repository are reflected in a data hub and UUP (or any other repository that may be visible/aggregated by the UUP). The UUP is a virtual view of other data repositories such that, when data is updated, the view by default is also updated. Alternatively, the data is synchronized/replicated from the repository. In such a situation, automation of the process between OSS/BSS repositories and the UUP occurs. However, if this is not well automated, then the workflows may be responsible for triggering the replications in order to make sure the changes are correctly reflected in the UUP. The end result seen by the application is the same, but any corresponding actions are taken care of by the workflow. Another alternative has the UUP component updating the data in a database component with SOA data management capabilities, wherein the database component itself is able to trigger a workflow that creates a business process which interacts with the OSS/BSS.

Figure 2:
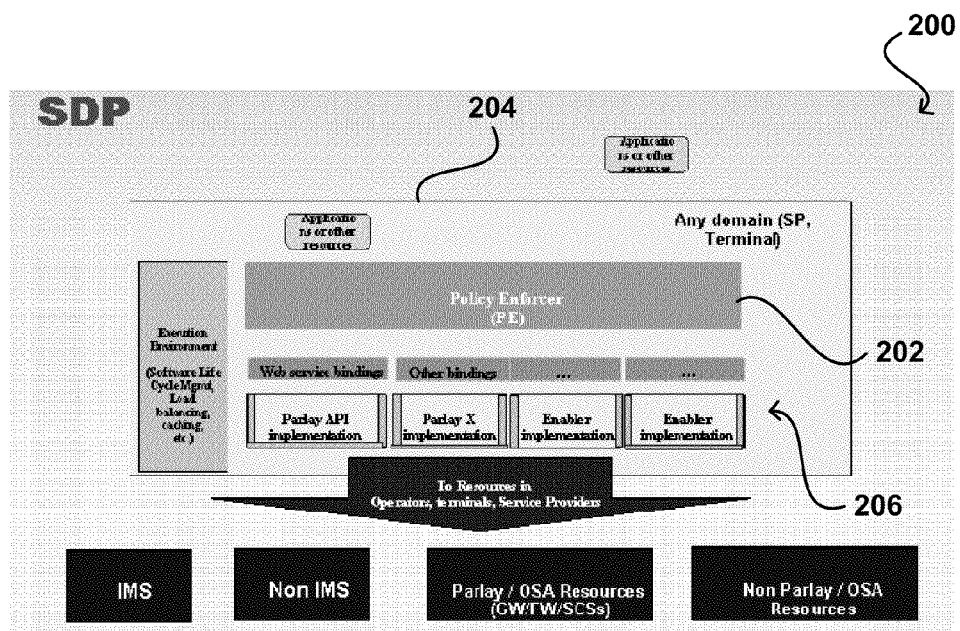
FIG. 2 illustrates an implementation for connecting to network resources and gateways that can be used in accordance with one embodiment.

FIG. 2 illustrates how, through use of components such as a policy enforcer (PE) and Web service and other bindings (e.g., standard northbound interfaces), any domain (SP, terminal) can connect to resources in operators, terminals, service providers, etc., using an SDP-based implementation 200. The policy enforcer 202 is able to enforce a policy (any combination of conditions and actions) on all messages through the SDP, as well as performing functions such as applying factor business rules and enforcing SOA orchestration. Applications or other resources inside or outside the domain 204 can take advantage of these resources through components of the SDP, as the SDP can define the interactions between applications that are "inside" the domain and third party or other applications "outside" the domain. The SDP can include components 206 such as various enablers as discussed above and/or Parlay X or Parlay API components, which can be reusable and/or composable components with desired intrinsic functionality discussed below. The components 206 can then communicate with resources such as IMS and non-IMS resources, as well as Parlay/OSA resources (GW/FW/SCSs) and non Parlay/OSA resources, allowing implementations on different networks to co-exist. The Parlay components can be used at the same level as the enablers and thus realized on SIP, forming the OSA AS.

Figure 3:
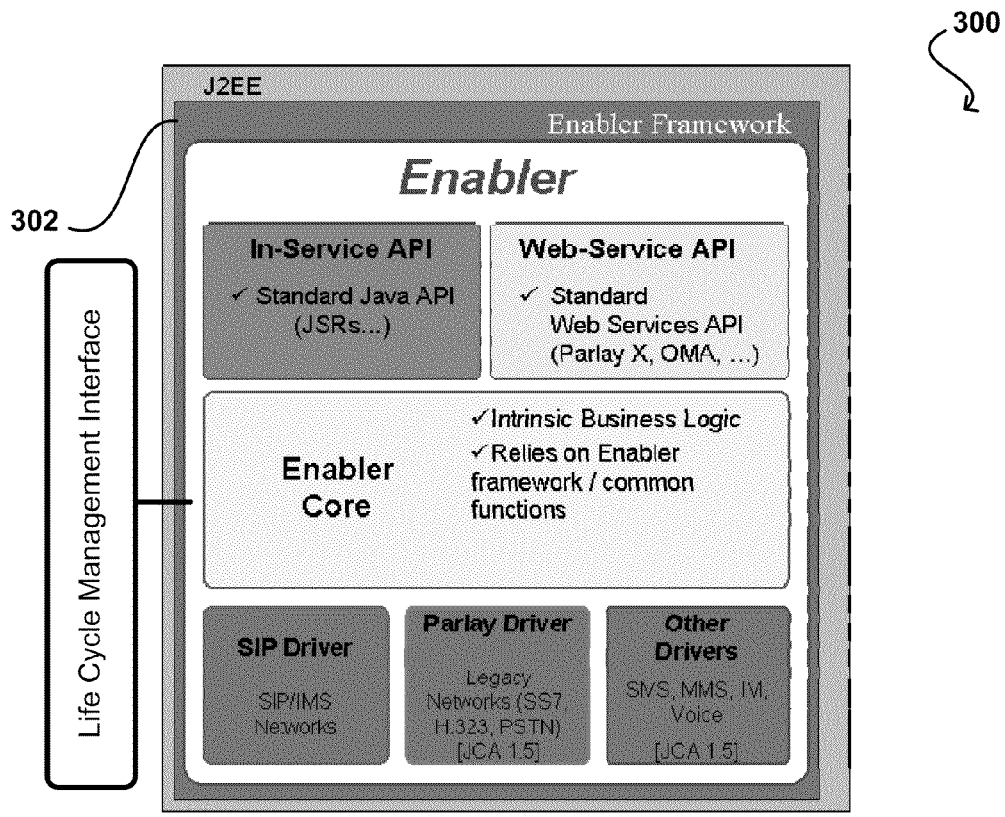
FIG. 3 illustrates an enabler operatively coupled to a life cycle management interface that can be used in accordance with one embodiment.

FIG. 3 illustrates an example of an enabler 300 that can be used with the SDP implementation of FIG. 2. In this example, the enabler 300 is a reusable and/or composable J2EE (Java 2 Platform, Enterprise Edition available from Sun Microsystems, Inc.) object that is able to expose useful intrinsic functions, such as call control, presence, messaging, charging, media server control, voice access, providing a unified user profile (UUP), resource management, etc. The enabler also can utilize a standardized northbound API for Java and/or Web services, for example, and can abstract resources via adapters to network and platform elements, providing network abstraction, platform extraction, and standard techniques, such as SIP or JCA 1.5, with a recipe for predictable low latency and high throughput. The enabler also can be part of, or based on, an enabler framework 302, or set of common functionality, which can provide for persistence, high availability, management, logging, security, life cycle support (installation, etc.), scalability, versioning, etc.

The enabler of FIG. 3 is connected to a life cycle management interface. The interaction between a life cycle management interface and an enabler is described in U.S. Pat. No. 8,458,703, issued Jun. 4, 2013, titled "RESOURCE ABSTRACTION VIA ENABLER AND METADATA,", which is hereby incorporated by reference.

The enablers and enabler framework can provide for use of SOA throughout the SDP-based approach to providing telephony application services, providing exposure of Web services to third parties and/or third party gateways, and providing the implementation of policy application and orchestration in BPEL, including functionality such as carrier grade BPEL/SOA. The Enabler framework also can provide for the use of rules or policies (PDP), as well as technologies such as BAM and Studio: SCE (Service Creation Environment). The use of an enabler framework also can allow various policies to be applied, such as OSE PE, OMA PEEM, IETF PDP/PEP, 3PGW, or Subscriber GW policies, which can be implemented on an SOA-based architecture to take advantage of BPEL, a rules engine, Oracle Web Services Manager (OWSM), etc. Any process execution language can be used, including not only BPEL but also various other rules, scripts, etc. The enablers also can provide for OSS/BSS/SDP integration, providing functionality such as WS, ESB, SOA, etc., as described in U.S. patent application Ser. No. 12/019, 335, filed Jan. 24, 2008, cited above.

Figure 4:
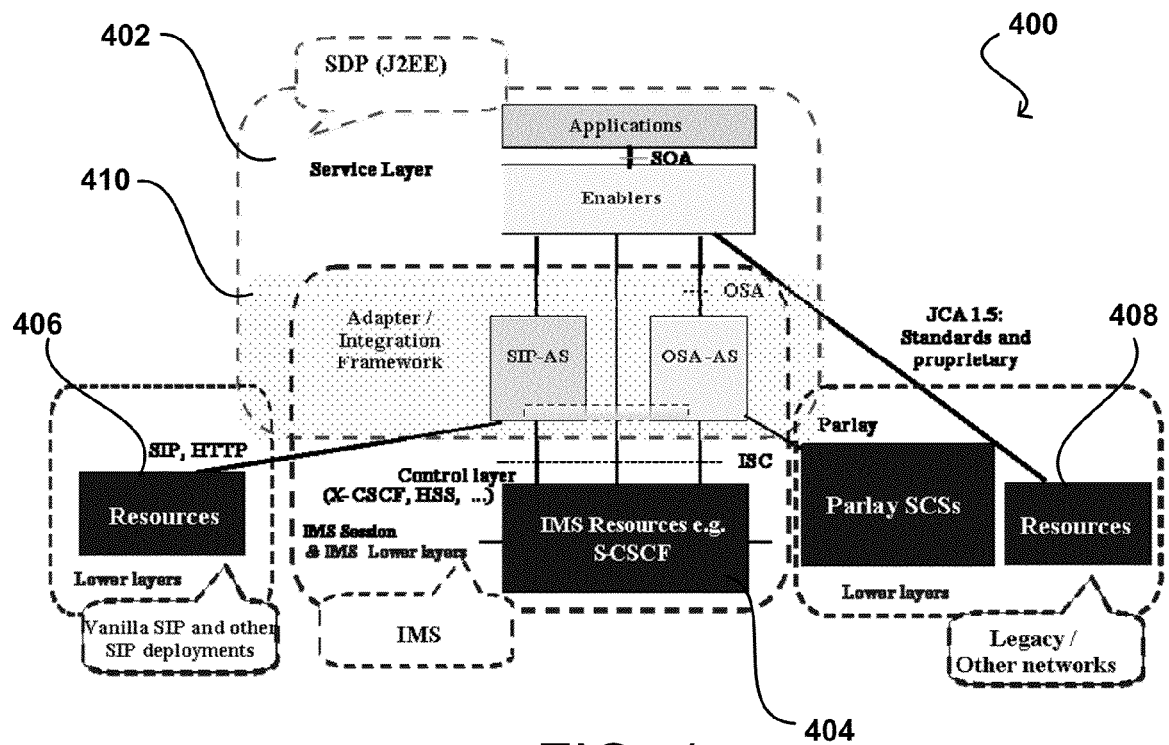
FIG. 4 illustrates an implementation for connecting to network resources and gateways that can be used in accordance with one embodiment.

As discussed above, such an approach provides for integration with networks such as IMS and legacy networks. FIG. 4 illustrates an example 400 of one such implementation in accordance with one embodiment. In this example, applications and enablers at the service layer, utilizing an SDP as described above, are able to access resources such as IMS resources 404, SIP resources 406, and legacy or other network resources 408 through an adapter or integration framework 410 as discussed elsewhere herein. The framework 410 can include SIP application services to access SIP resources, as well as OSA application services to access other network resources (using Parlay, JCA (to IN protocols), etc.), and both the SIP AS and OSA AS can be used to access IMS resources, e.g., S-CSCF. Such an implementation provides for co-existence of the resources across the networks, along with a smooth migration to new or additional networks. Such an implementation also can provide for convergence via network abstractions, allowing services on any networks, as well as Identity Management through the SP domain and shared integrated OSS/BSS for true convergence.

Figure 5:
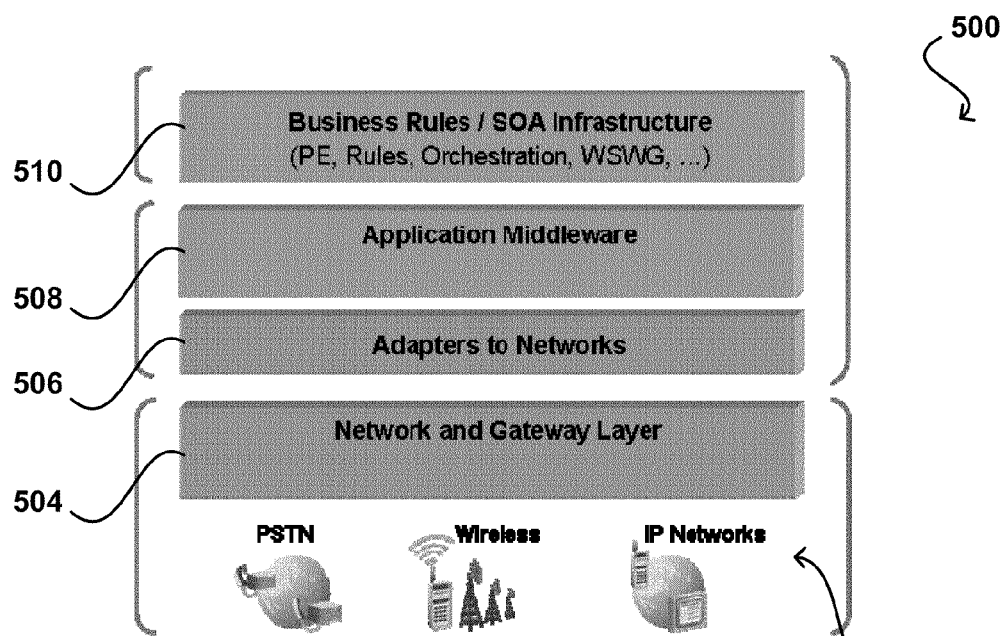
FIG. 5 illustrates an implementation for connecting to network resources and gateways that can be used in accordance with one embodiment.

As illustrated in the stack 500 of FIG. 5, use of an SDP allows an SOA-based implementation to be used for telephony AS independent of the network technology and/or vendor. As can be seen, there can be various network components and gateways 502, such as PSTN, Wireless, and IP Network components. A network and gateway layer 504 can be used in combination with a network adapter layer 506 (or as part of the same layer) in order to communicate with the various components and gateways. Application middleware 508 can take advantage of the network adapter layer 506 to provide for functions such as development, deployment, execution, and management, independent of business rules and the specific network. The SOA infrastructure and business rules then can be provided as a layer 510 on top of the middleware layer, providing for the application of business rules and SOA, including functions such as PE, rules, orchestration, WSGW (WS gateway), etc.

Figure 6:
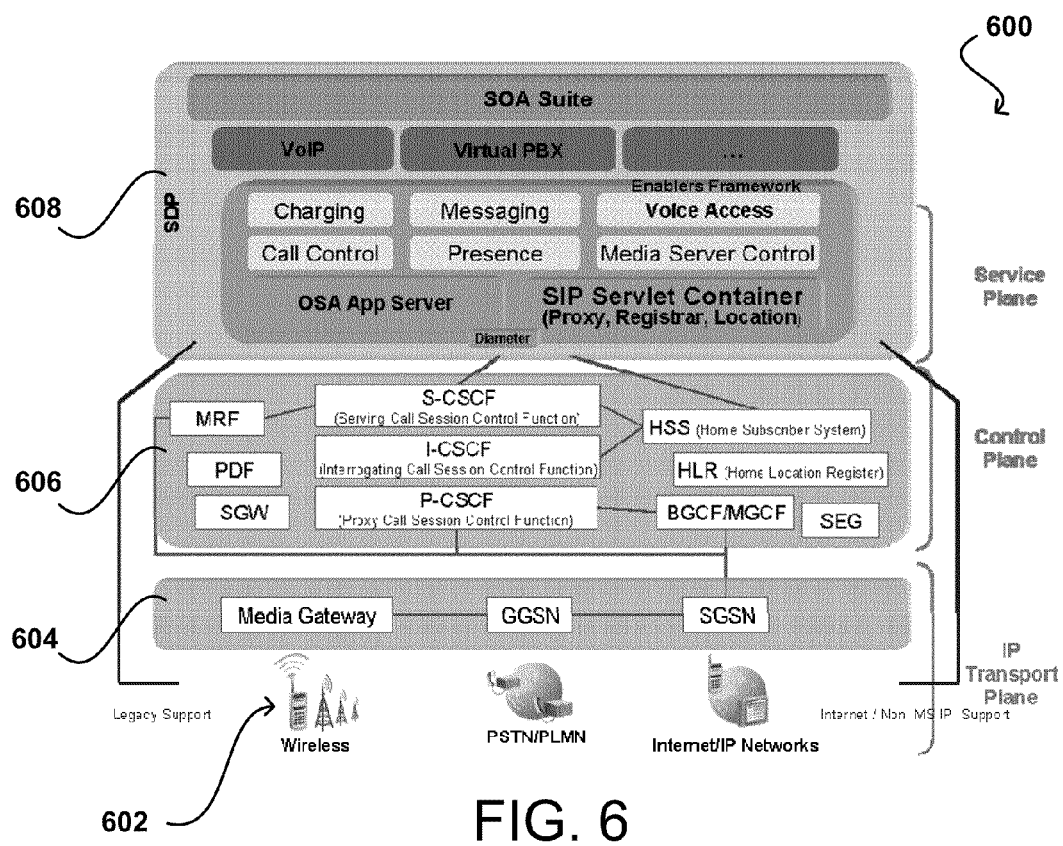
FIG. 6 illustrates an implementation for connecting to network resources and gateways that can be used in accordance with one embodiment.

FIG. 6 illustrates another example 600 of a layered implementation that can be used to provide integration with networks components and gateways 602, such as components of IMS, NGNs, Internet, and legacy networks, in accordance with one embodiment. In this example, the network components and gateways 602, together with the components (e.g., media gateway, GGSN, SGSN) of the network and gateway layer 604, form an IP transport plane. A control plane 606 can be formed on the IP transport plane, the control plane including middleware and adapters including S-CSCF, I-CSCF, P-CSCF, HSS, HLR, and other components as discussed elsewhere herein. An SDP then can be deployed on the control plane as part of a "service" plane 608, which can include components such as the SOA components, applications such as VoIP and PBX applications, the enablers framework, and other components such as described with respect to FIG. 2.

Figure 7:
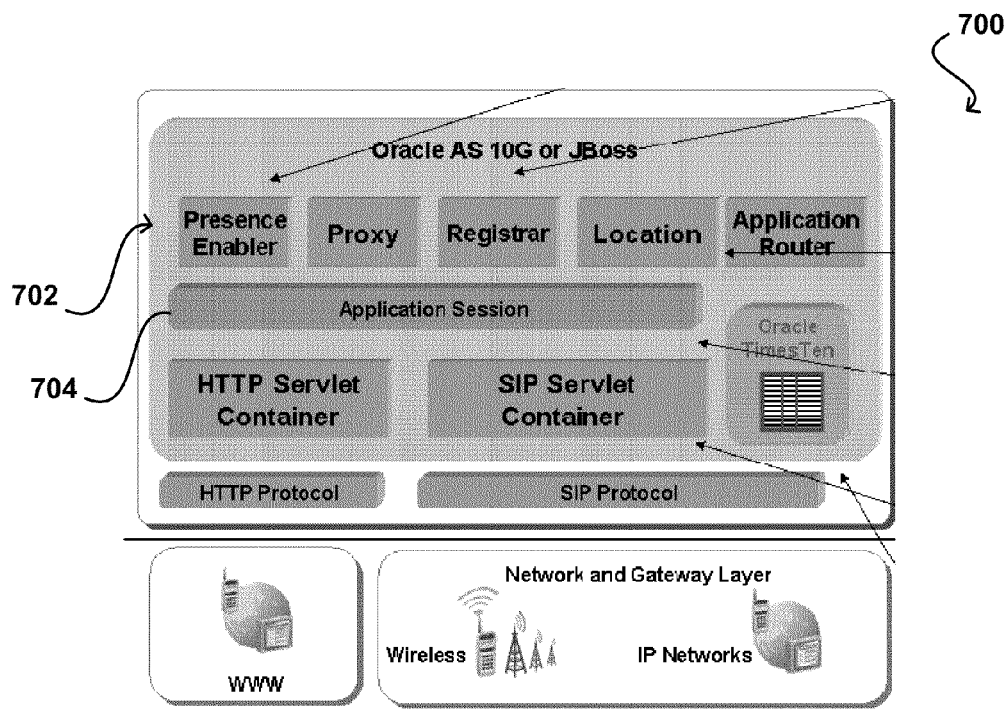
FIG. 7 illustrates components of a communication and mobility server that can be used in accordance with one embodiment.

The service plane in FIG. 6 also includes a SIP servlet container, providing functionality such as proxy, registrar, and location functionality. FIG. 7 illustrates an example of an example architecture 700 for such a SIP container that can be used in accordance with one embodiment. Such an implementation can be used to provide a communication and mobility server in one embodiment, which can be used to provide a telephony AS on devices such as telephones, cellular phones, PDAs, etc. The architecture is shown to include a number of SIP infrastructure enablers 702. One such enabler is a presence enabler for providing presence information such as SIP/SIMPLE, Presence, XDM, RLS and aggregation. Other enablers can include a proxy for SIP routing, a registrar enabler for mapping a public address to current user information, a location enabler for determining current user SIP network location, an application router, etc. The architecture also includes an application session component 704 allowing SIP and HTTP servlets, for example, to share session state via an application object. The architecture can also include containers and protocol components for HTTP, SIP, and other protocols as needed for the target network and gateway components.

The SIP container in FIG. 7 is, in one embodiment, a JSR-116 or JSR-289 compliant container that provides converged application support (e.g., click-to-call), radius support (e.g., a specialized login module), and integrated AAA database and Session Traversal Utilities for NAT (STUN) support. The container also can provide support for integrating with ENUM (E.164 Number Mapping) databases for number translation. The container can be compatible with Diameter (Sh, Ro, Rf, . . . ) and can provide availability across platforms such as Linux, SUN, Solaris, HPUX, AIX, Windows, etc.

Such a communication and mobility server in one embodiment can provide support for a scalable proxy registrar and location services for VoIP applications, as well as a re-brandable VoIP/video/IM client. The server also can be IMS-ready, able to be deployed as an IMS SIP application server and/or an IMS presence server. The presence server can be SIP/SIMPLE compliant, and can provide XDM (XML Document Management), RLS (Resource List Server), and Presence Aggregation Support. The presence server also can be OMA (Open Mobile Alliance) and IMS compliant.

Figure 8:
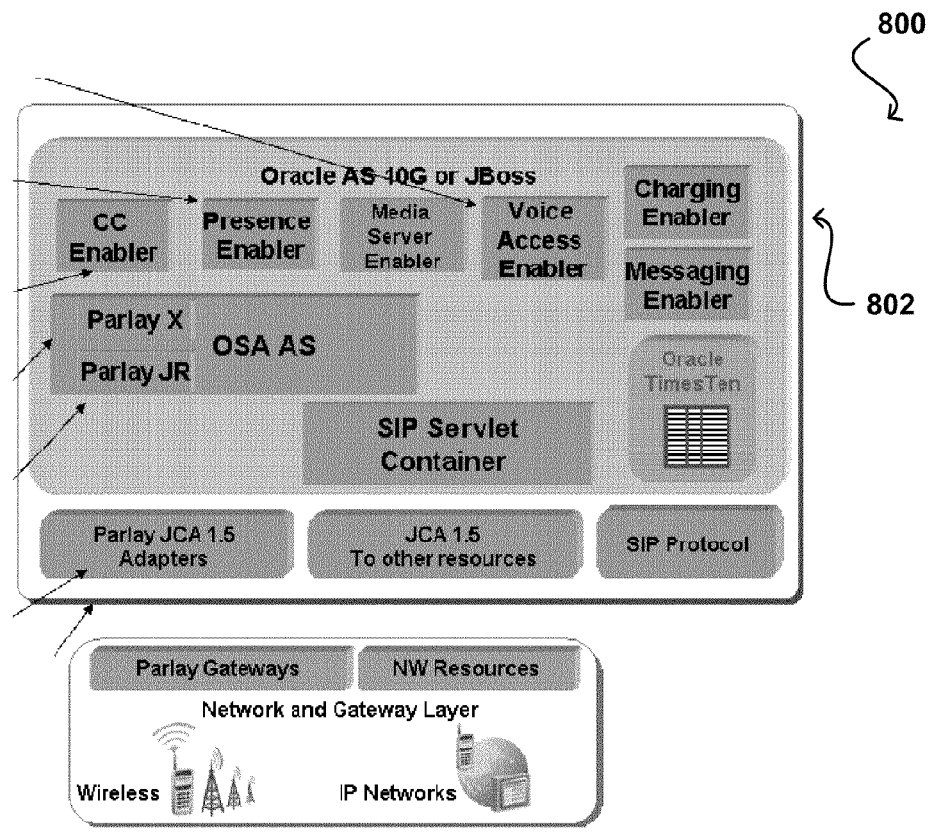
FIG. 8 illustrates components of an network connectivity server that can be used in accordance with one embodiment.

FIG. 8 illustrates a similar architecture 800 to that described with respect to FIG. 7, but in this case providing a network connectivity server implementation, or an OSA AS target architecture, in accordance with one embodiment. In this example, various other enablers 802 are provided, including charging, messaging, media server control, and voice access enablers, although various other combinations can be provided as desired. A presence enabler can be used to expose network presence as a user status from HLR via Parlay. A multi-party call control enabler can be used for Parlay, SIP, and others. An OSA AS component can be provided that can include a Parlay 5.1 Java realization and Parlay X 2.1 WS, for example. The OSA AS also can provide legacy and IMS compatibility, and can manage and maintain Parlay gateway registrations. A number of adapters also can be included, such as JCA 1.5 adapters and Parlay JCA adapters to Parlay gateway (Corba) and other network resources.

Figure 9:
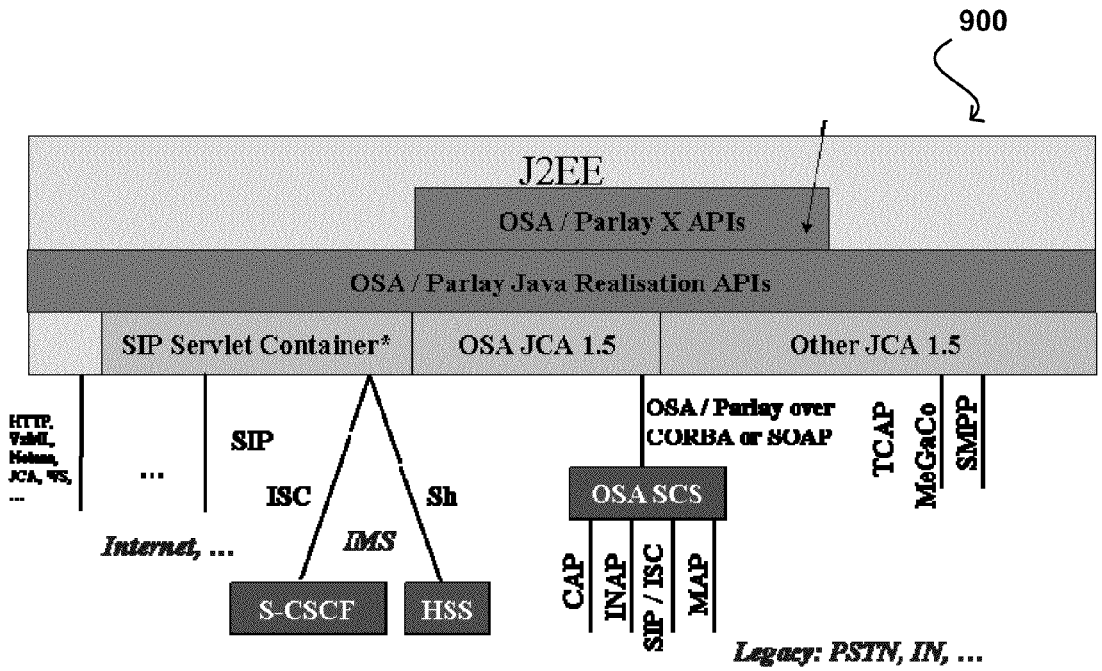
FIG. 9 illustrates an implementation of the Open Services Architecture (OSA) Application Server (AS) component that can be used in accordance with one embodiment.

Such a network connectivity server can allow Next Generation Networking (NGN) applications to be developed that run on today's networks, providing a smooth migration of services from legacy to IMS/IP. The inclusion of a network adaptation layer provides JCA 1.5-based connectivity to a Parlay gateway, which is extensible to any resource, and provides for OSA AS in J2EE, using Parlay/Parlay X realization APIs and working on JCA 1.5 and SIP. The layer also provides multi-application server support and high performance. For example, FIG. 9 illustrates a view of an implementation of the OSA AS component 900 of FIG. 8 in accordance with one embodiment, which rigorously follows a Parlay 5.1 Java Realization (J2EE Local) and Parlay X 2.1 WS. While the enablers in such an implementation may share northbound interfaces with Parlay JR/X, the enablers can be more than simply Parlay components as discussed elsewhere herein.

Figure 10:
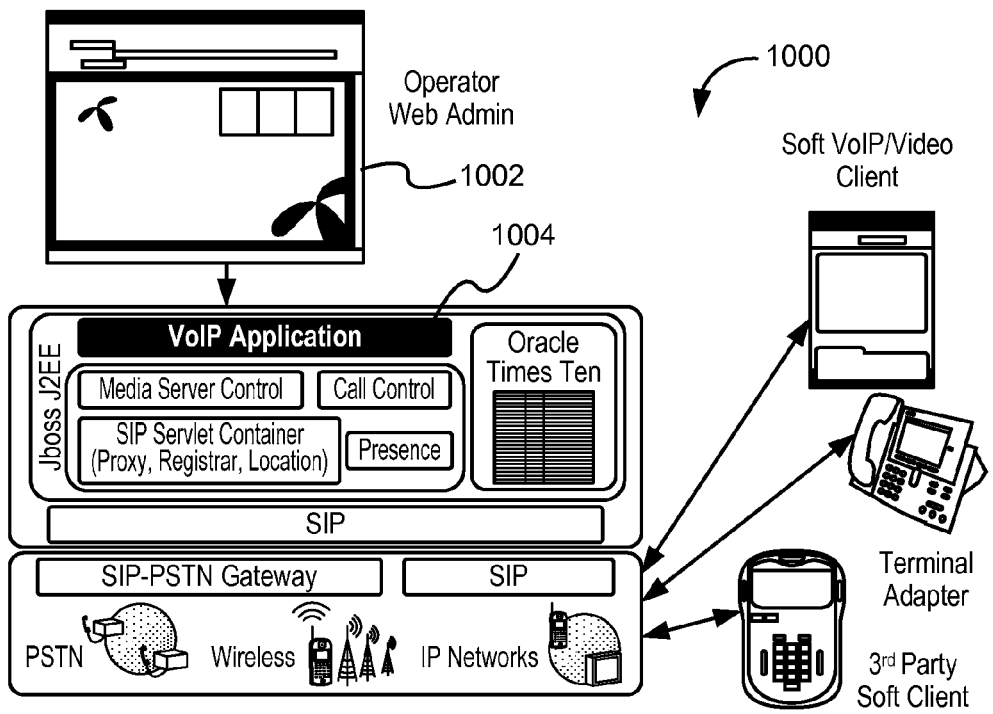
FIG. 10 illustrates use with a VoIP application in accordance with one embodiment.

As discussed, such approaches can be used to provide telephone application services that can be utilized by a number of different applications and technologies. In one example, a VoIP application can be provided that takes advantage of implementations in accordance with various embodiments. For example, FIG. 10 illustrates an example 1000 wherein an interface 1002 for a VoIP application 1004 is shown to allow a user, such as an operator, to access and utilize the system to communicate with devices such as soft VoIP/Video clients, terminal adapters, and third party soft clients. Such a VoIP application can compose a selection of widgets to provide functions such as voice calling, video calling, instant messaging including audio messaging, call history, custom presence subscription and publication, presence policy management, multi-account management, contact list management, custom installer, branded skins and themes, and high quality audio and video codecs including G.711, G.729, H.261, and H.263. A VoIP application also can be extensible on SDP, providing functions such as presence and instant messaging (e.g., Presence+VoIP/Video, Presence+VoIP+Video SIP-Interoperability with X10, and Presence+VoIP+Termination on PSTN (Call out)). Such an application also can provide functionality such as call in, SMS out, SMS in, dual ring, video mail, ring back tone, location-based RBT, etc. Such a VoIP application can include features such as legal intercept, class 5 features, PSTN and voice mail routing, call forwarding, caller privacy and/or identity, incoming and outgoing call barring, PSTN prefix, ENUM routing, address translation, local number routing, emergency service routing, ACR/DCR (regulatory features), and legal intercept (CALEA and similar), built on an industry-standard platform such as J2EE and running on commodity hardware.

Figure 11:
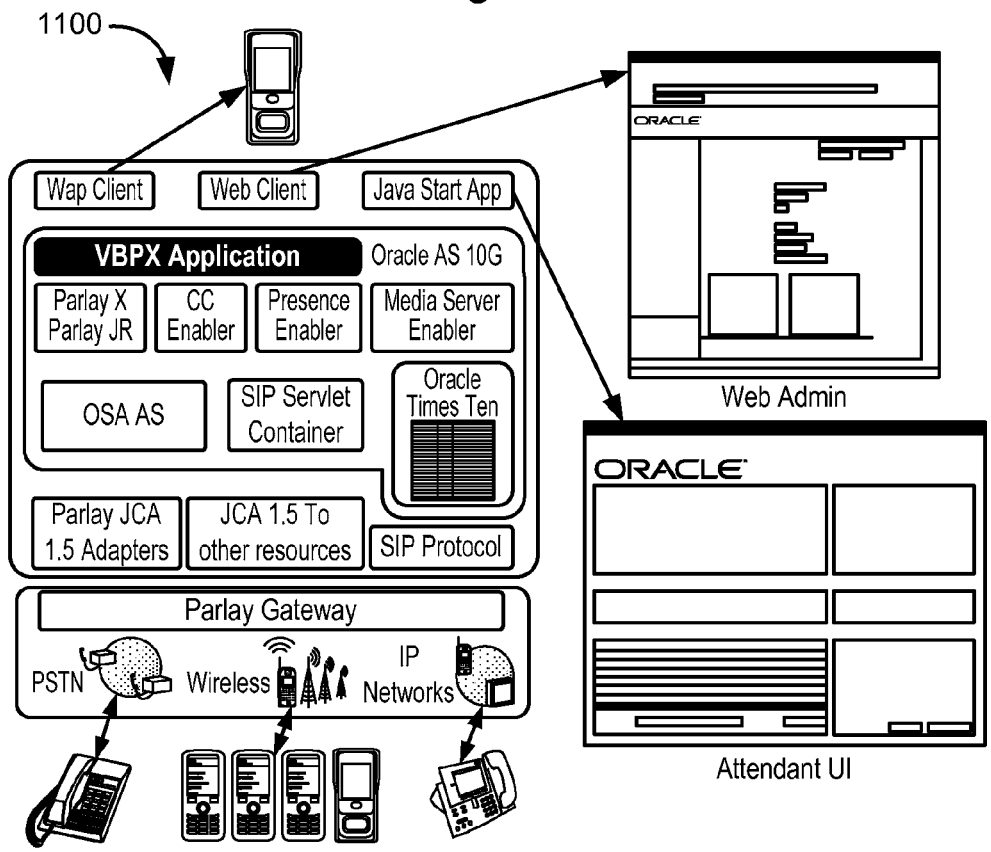
FIG. 11 illustrates use with a virtual private branch exchange (PBX) application in accordance with one embodiment.

FIG. 11 illustrates an implementation 1100 in accordance with another example, here providing virtual PBX functionality via a telephony AS. Such an application can provide IP-based and hosted PBX services to enterprise users, for example. Such an application can compose a selection of widgets to provide functionality such as attendant queues, hunting groups, automatic attendant, switchboard client, subscriber self administration, branding, subscriber availability management, provisioning interfaces, and reporting, built on an industry-standard platform such as J2EE and running on commodity hardware, and providing for service customization.

Various features exposed by such a platform as enablers or applications can be combined using SOA or SOA SCIM (such as is described in U.S. patent application Ser. No. 12/018,718, filed Jan. 23, 2008, entitled "Service Oriented Architecture-Based SCIM Platform" (pending examination) and application dispatching (such as is described in U.S. patent application Ser. No. 11/969,343, filed Jan. 4, 2008, entitled "Abstract Application Dispatcher" (pending examination)), each of those applications hereby being incorporated herein by reference. In an SOA SCIM-based approach, use or the SDP provides for other approaches where "in S-CSCF" or "in network", or limited to SIP AS lacks service level context/composition with other enablers. Service level intrinsic SCIM functions can be provided as application routing on the message, SIP servlet composition (for SIP only), SOA composition of enablers, application building blocks or applications, and/or application dispatching in service layer. The services thus can be applied "on call" by combining using SOA SCIM or application dispatching.

Figure 12:
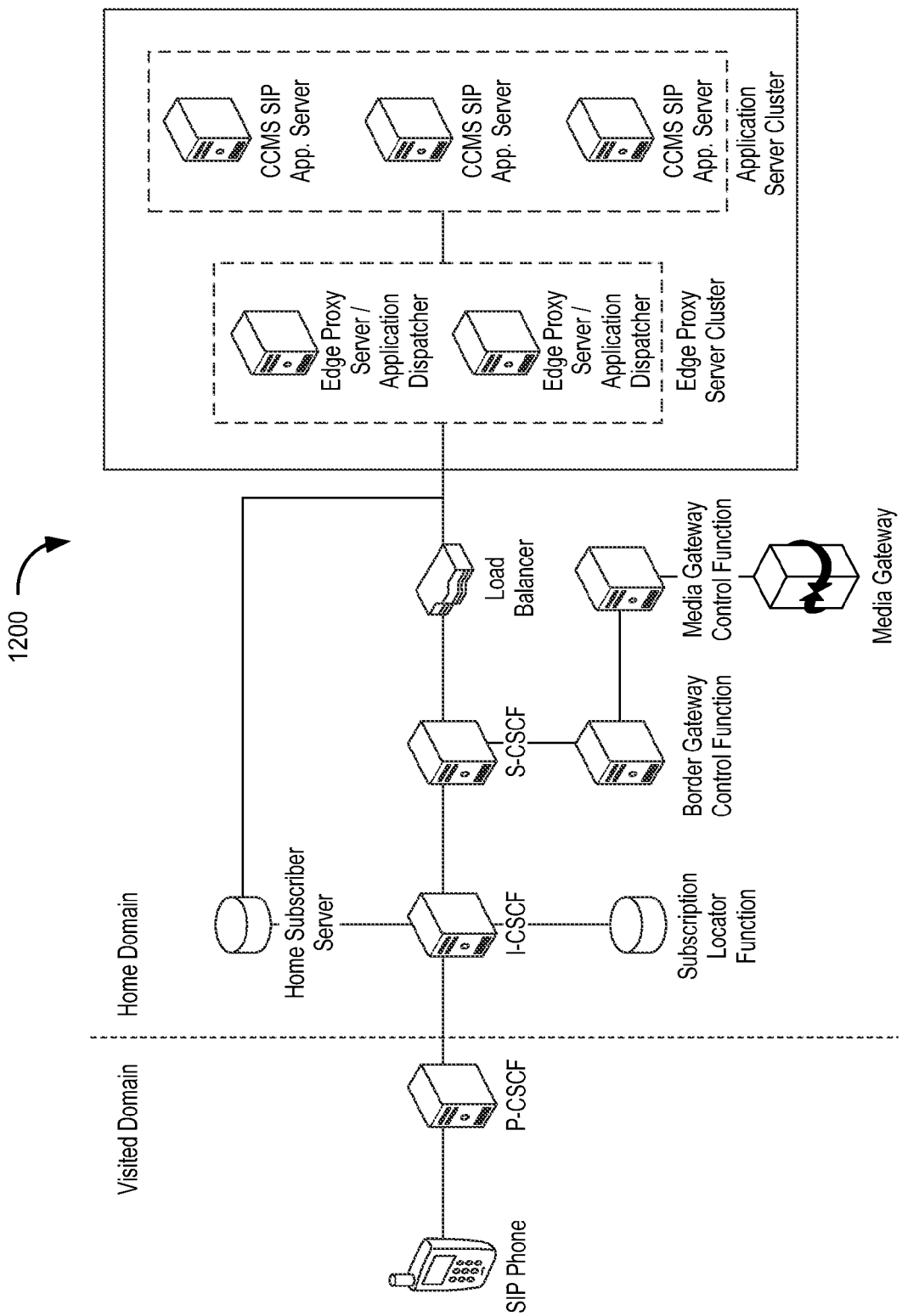
FIG. 12 illustrates components for integrating functionality with IP Multimedia Subsystem (IMS) in accordance with one embodiment.

Integration of such functionality with IMS is achieved in one embodiment as illustrated in the example 1200 of FIG. 12. In the figure, OCMS (Oracle® Communication and Mobility Server) is the SDP were the telephony AS executes. Such an implementation can provide for application dispatching, as well as VoIP/VPBX domain with registrar/location replication, such as is described in more detail in co-pending U.S. patent application Ser. No. 11/383,024, filed May 12, 2006, entitled "SIP Routing Customization" (pending examination), which is hereby incorporated herein by reference. Such a deployment also can provide for third party registration to S-CSCF. In all cases the S-CSCF now identifies inclusion of the SIP AS on the message path (i.e., as a Telephony service). Using VoIP with such a deployment provides telephony AS in J2EE, for example, to provide VoIP services dispatched on calls (SCIM)+VPBX, Adapters (JCA 1.5) or Network GWs (e.g. PIMG) to integrate to NGN, legacy resources, (IP)-PBX and (IP) Centrex, and custom features as J2EE components. The method of integration can be made relatively "generic" in order to allow integration of a non-IMS SIP application to IMS, or an application that provides Telephony service on SDP (i.e., via enabler) to IMS and legacy (PSTN/IN) networks because the services are abstracted from the network. The application may also need access to user data, but this can be accomplished in one embodiment using a unified user provide (UUP) discussed above that provides a virtual view of the all the subscriber data.

Figure 16:
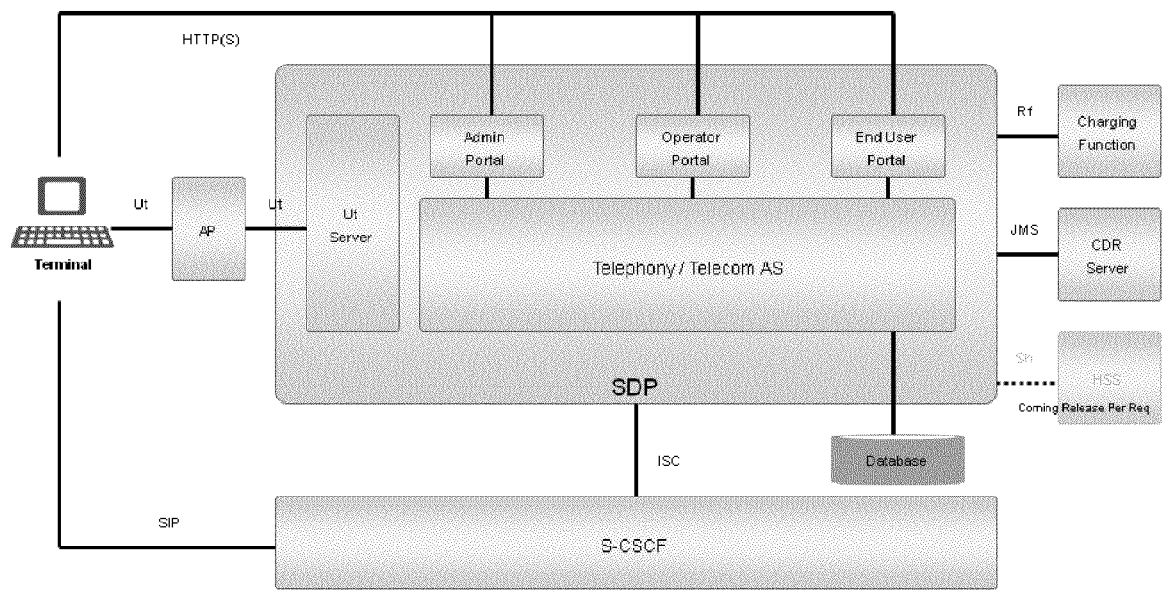
FIG. 16 illustrates a telephony/telecom application server in an IMS, in accordance with the present invention.
Figure 17:
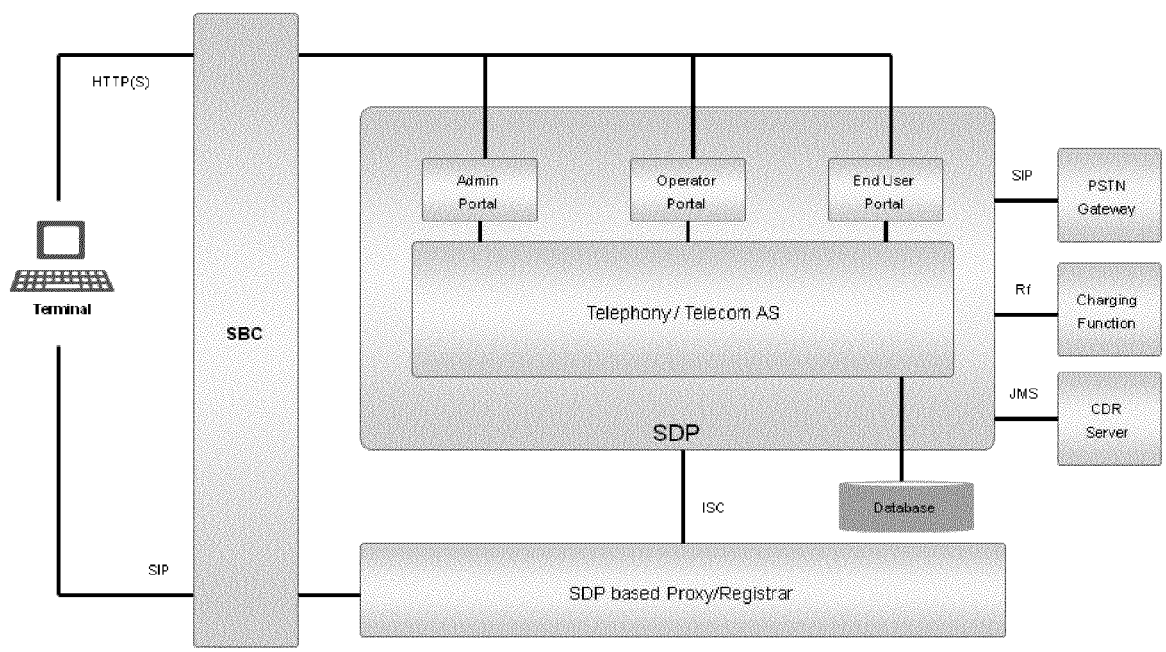
FIG. 17 illustrates a telephony/telecom application server in a non-IMS with Session Border Control (SBC), in accordance with the present invention.
Figure 18:
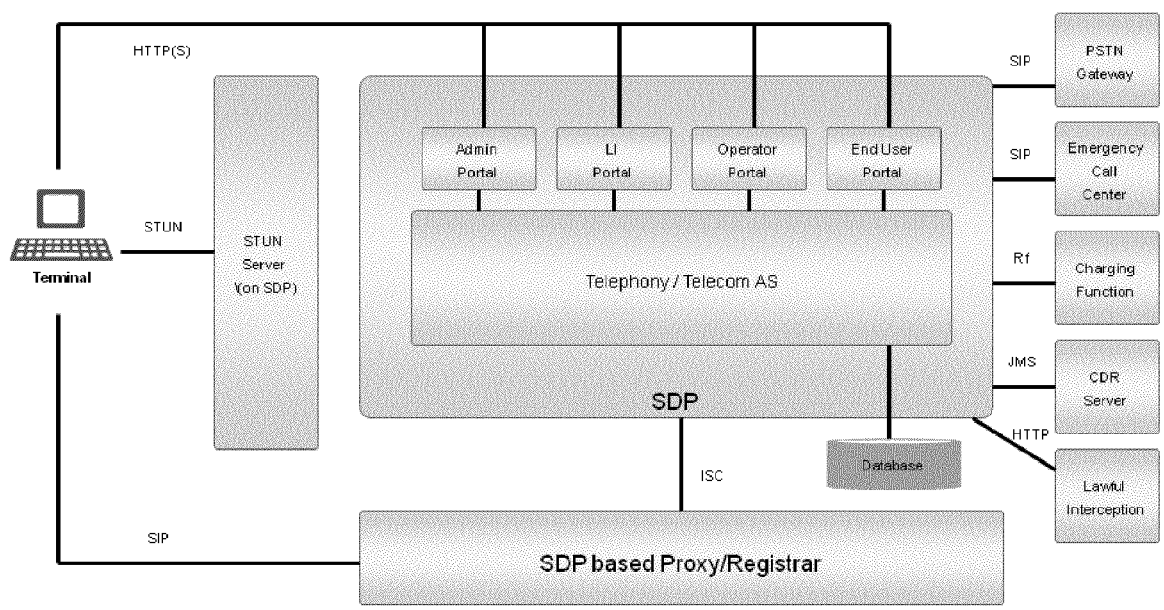
FIG. 18 illustrates a telephony/telecom application server in a non-IMS without Session Border Control (SBC), in accordance with the present invention.
Figure 19:
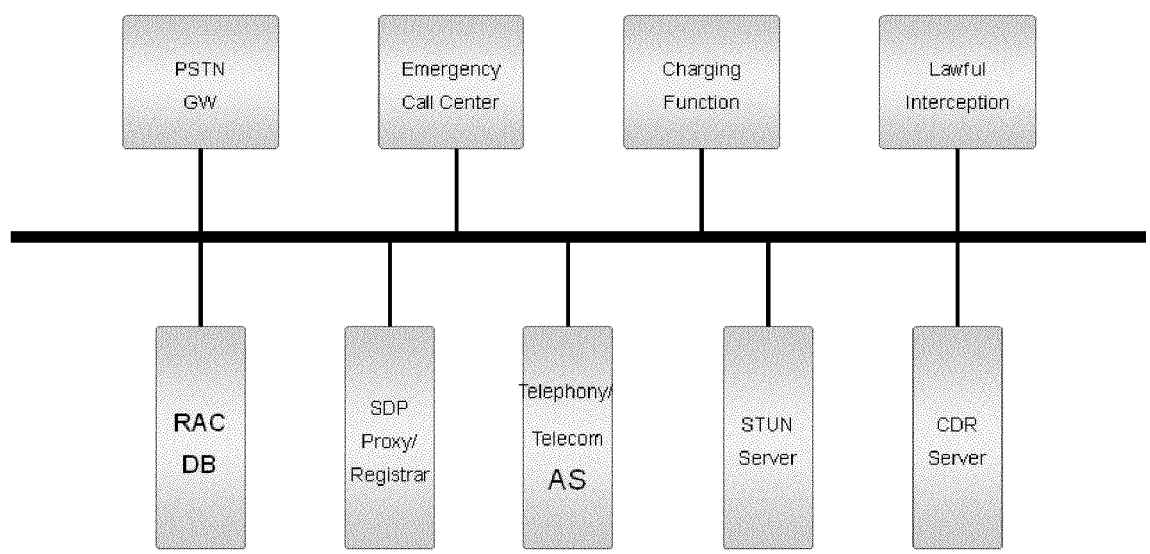
FIG. 19 illustrates a single deployment, in accordance with the present invention.
Figure 20:
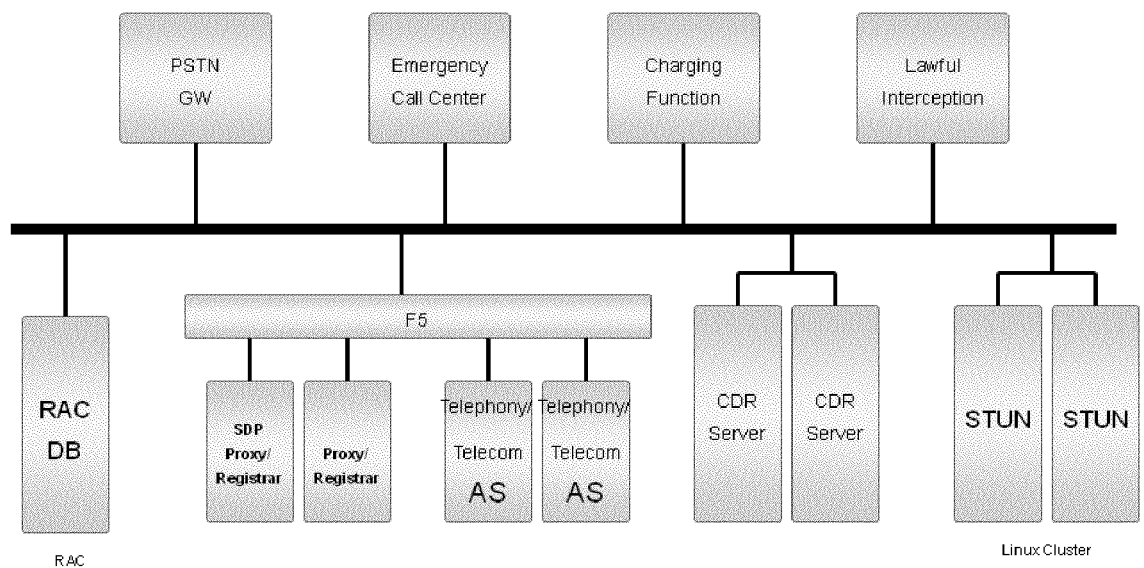
FIG. 20 illustrates a deployment in a cluster, in accordance with the present invention.

FIGS. 16-20 illustrate various embodiments with an application server in accordance with the present invention. FIG. 16 illustrates a telephony/telecom application server in an IMS, FIG. 17 illustrates a telephony/telecom application server in a non-IMS with Session Border Control (SBC), and FIG. 18 illustrates a telephony/telecom application server in a non-IMS without Session Border Control (SBC). FIG. 19 illustrates a single deployment and FIG. 20 illustrates a deployment in a cluster. These IMS and non-IMS options and deployment considerations are presented as examples only.

In accordance with the above descriptions, a set of widgets can be built on various programming models in an operating environment (discussed below). Each widget represents a base function required for the support of typical and other telephony functions, such as:
1) creating a call between two parties;
2) terminating a call (created or existing) between two parties;
3) modifying each leg in a call (created or existing);
4) processing a call notification and directing to another party or terminating;
5) creating a media server session to mix more than two parties in a call;
6) adding a call to a media session;
7) removing the call from a media session;
8) processing a call (e.g. mute, un-mute, transform, on hold);
9) managing the media session (e.g. who has the floor, muting, DTMF processing);
10) providing dialog management (e.g. DTMF dialog/recognition or dialog recognition) to a call or a media session;
11) queuing calls;
12) managing call queues;
13) translating numbers;
14) handing short code;
15) routing emergency calls;
16) barring calls (incoming/outgoing);
17) instant messaging;
18) enabling caller line identification restrictions and caller privacy;
19) enabling caller line identification presentation;
20) rejecting an anonymous call;
21) rejecting a diverted call;
22) enabling call forwarding:
 a. busy,
 b. no answer,
 c. unconditional,
 d. unreachable;
23) enabling call recording;
24) enabling call (legal) intercept;
25) enabling ring tones for the call;
26) ringing back a tone for the call;
27) accessing a user profile;
28) accessing a user presence;
29) enabling voicemail functions;
30) start charging for the call/event;
31) delegating charging for call events:
 a. pre-paid,
 b. post-paid;
32) stop charging for the call;
33) getting a charge/account balance notification;
34) checking a balance;
35) enabling Call Detail Record (CDR) generation;
36) reserving an amount for charging;
37) sending a message;
38) routing a message;
39) transforming a message;
40) enabling a private call network (VPN);
41) getting a caller ID;
42) getting a caller ID on-going for a user/user equipment;
43) selecting the network/network equipment;
44) discovering the network/network equipment; and
45) enabling a unique subscriber number.

In an embodiment, the functions in the widgets above are implemented as reusable components (e.g. SIP servlets or SOA service calling enablers). The functions could also be implemented on SIP servlets or on an IN, as described in U.S. patent application Ser. No. 13/021,991 filed Feb. 7, 2011, titled "SERVICE BASED CONSOLIDATION OF APPLICATION ACROSS NETWORKS," which is hereby incorporated by reference.

The widgets are then composed (in code logic or via business processes like BPEL which may be precompiled at run time).

Applications such as conference VpBX or Telephony class 5 (e.g. residential VoIP) can be built as a combination of widgets, such as the example widgets below:
1. Conference:
 a. calls are received;
 b. call is processed via dialog management;
 c. first call may create a media session;
 d. other calls authorized are sent by dialogs, and then are added to a media session; and
 e. media session implements mixing, muting, and DTMF processing.
2. VPBX, IP-PBX:
 a. calls are received;
 b. calls are queued;
 c. the manager is notified of the queue;
 d. the manager manages the queue and re-directs the calls;
 e. the calls are re-directed as needed; and
 f. VPPN/number translation/voice mail/dialog management can be added.
3. Residential Telephony:
 a. class five services are covered by the widgets described.
4. Network Interworking/Session Border Control can be Seen as Controlling:
 a. incoming calls;
 b. directing to call processing; and
 c. generating a call (in another network).

Some advantages of present embodiments over prior technology are that: (1) the same widgets can be used for almost all network technologies; (2) IT/SOA development of the widgets can be performed on an IT platform (e.g. JEE); and (3) there can be IT/SOA composition of widgets via IT tools (e.g. BPEL studio).

Figure 15:
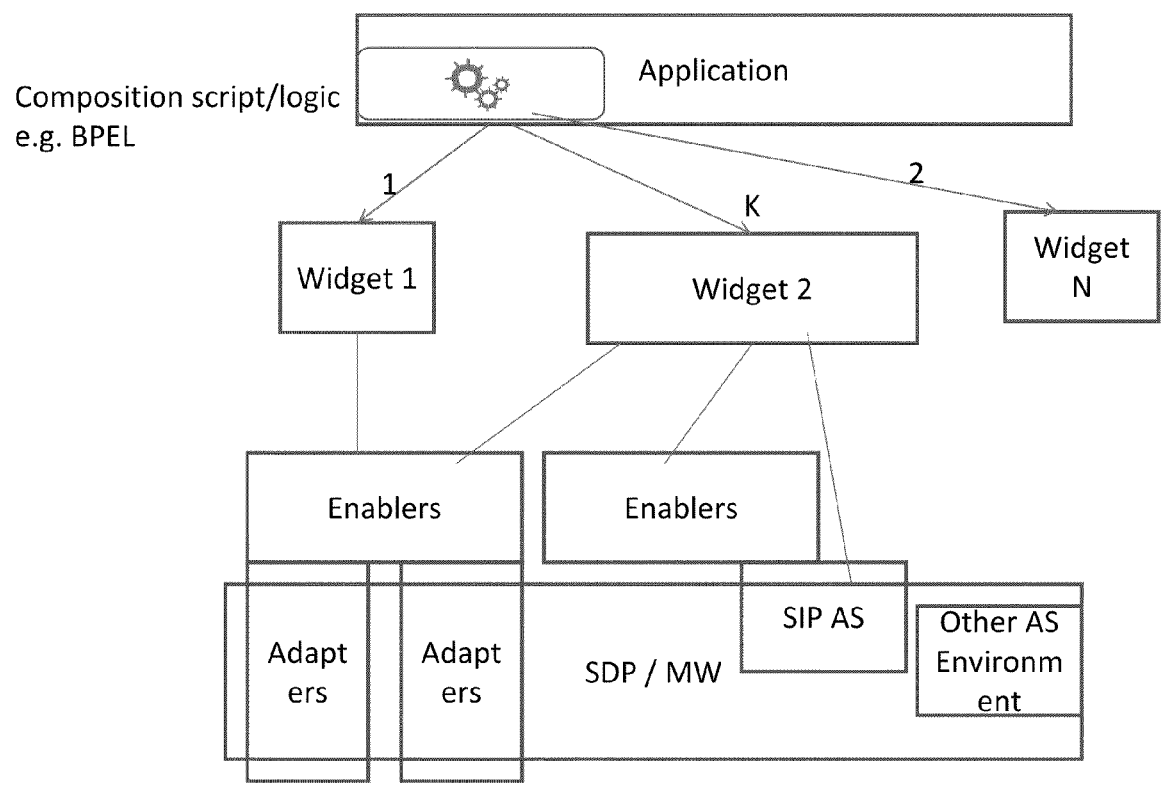
FIG. 15 illustrates widgets of an application providing functionality through enablers and adaptors through an SDP.

FIG. 15 illustrates widgets of an application providing functionality through enablers and adaptors through an SDP using enablers and adaptors to different networks. One to an arbitrary number, N, of widgets can be used by or incorporated into an application. The application can combine, integrate, or otherwise compose the widgets together. The composition of the widgets can be implemented in script/logic, for example Web Services Business Process Execution Language (WS-BPEL). A widget can connect to a Service Delivery Platform (SDP)/MW through an enabler. The enabler can have one or more adaptors to drive the underlying network, OSS/SBS or IT resources. It is also possible that enablers are used just to expose protocols directly within the the SDP/MW. A second widget can communicate with the enabler as well and use the same adaptors if necessary. It is possible that the widgets must use or mix functions on different networks. In that case, different adaptor/enabler instances may be involved. For example, a widget may determine which enabler instance to use for it to perform a task or set of tasks (e.g. provide a service) on a specific network (e.g. on the network where the call originated, on the network where the call is going to, or where the subscribers are associated). This amounts to selecting a network where one can, inter alia, create a call leg by selecting the correct enabler instance and/or gateway. The gateway could be one that can transfer media from one network to another. Widgets can also communicate with multiple enablers, including those that use Session Initiation Protocol (SIP) Application Server (AS). Other AS environments can also be serviced through the SDP, such as those using IN, Parlay, and other protocols.

Some widgets may not be connected to any enablers, but may be included in the application for internal use. Adjunct widgets can provide internal functions and processes for the application. Widgets are reusable components that implement a function useful to applications. Some widgets may provide things like a web or message driven interface to manage a queue that is really not a calling enabler but a separate reusable type of application module.

Applications can be a composition of widgets, utilizing BPEL or other script/logic code to integrate elements. The widgets can be mixed and matched to provide telephony services, billing services, and other functionality at the back end as part of the application. Separating the widgets and functionality from the particular network can allow the same application to be used on different networks without alteration.

In certain embodiments an application is used on two or more networks at the same time. One network can be a local area network and another a public switched telephone network (PSTN). Because the application services both disparate networks at the same time, the application behaves the same on each network. If a user switches from one network to another while using the application, the application can use the same memory states, cache pages, and other back-end server efficiency mechanisms to speed responses.

With an embodiment in which an application serves multiple disparate networks at the same time, a technician may be able to more easily troubleshoot and debug problems. One could test a function of the application on one network, then test the same function on the other network. If the same symptom of the problem occurs, then the technician could narrow down the problem to the application. If the symptom is different on the two networks, then the technician would narrow the problem to the network and not the application. This troubleshooting can be automated as well to determine the rough boundaries of the problem and whether anomaly occurs on the network or in the application.

Figure 13:
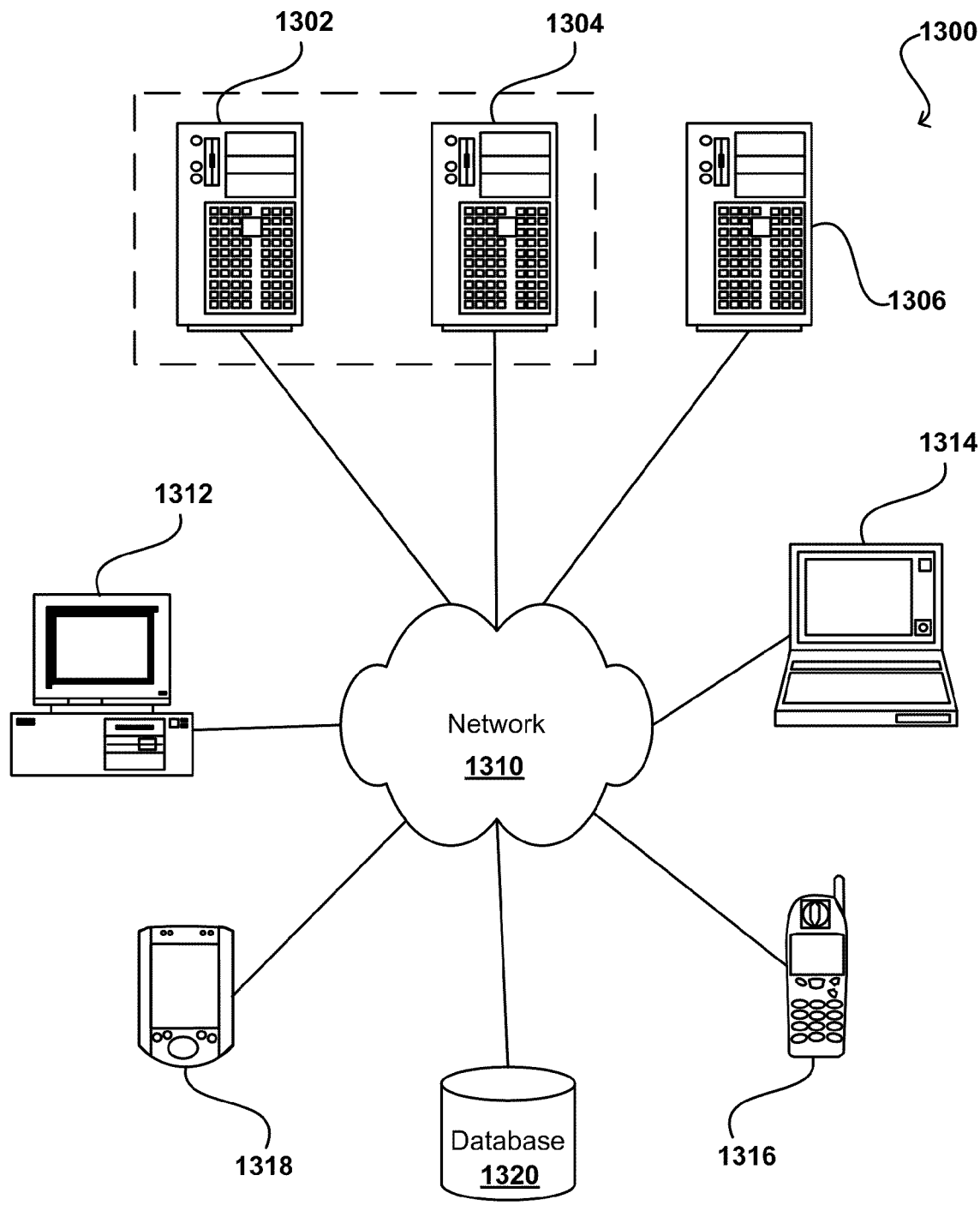
FIG. 13 illustrates components of a computer network that can be used in accordance with one embodiment.

Operating Environment:

FIG. 13 is a block diagram illustrating components of an exemplary operating environment in which various embodiments may be implemented. The system 1300 can include one or more user computers, computing devices, or processing devices 1312, 1314, 1316, 1318, which can be used to operate a client, such as a dedicated application, web browser, etc. The user computers 1312, 1314, 1316, 1318 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1312, 1314, 1316, 1318 may also have any of a variety of applications, including one or more development systems, database client and/or server applications, and Web browser applications. Alternatively, the user computers 1312, 1314, 1316, 1318 may be any other electronic device, such as a thin-client computer, Internet-enabled gaming system, and/or personal messaging device, capable of communicating via a network (e.g., the network 1310 described below) and/or displaying and navigating Web pages or other types of electronic documents. Although the exemplary system 1300 is shown with four user computers, any number of user computers may be supported.

In most embodiments, the system 1300 includes some type of network 1310. The network may can be any type of network familiar to those skilled in the art that can support data communications using any of a variety of commercially-available protocols, including without limitation TCP/IP, SNA, IPX, AppleTalk, and the like. Merely by way of example, the network 1310 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1302, 1304, 1306 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1306) may be dedicated to running applications, such as a business application, a Web server, application server, etc. Such servers may be used to process requests from user computers 1312, 1314, 1316, 1318. The applications can also include any number of applications for controlling access to resources of the servers 1302, 1304, 1306.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1312, 1314, 1316, 1318. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1312, 1314, 1316, 1318.

The system 1300 may also include one or more databases 1320. The database(s) 1320 may reside in a variety of locations. By way of example, a database 1320 may reside on a storage medium local to (and/or resident in) one or more of the computers 1302, 1304, 1306, 1312, 1314, 1316, 1318. Alternatively, it may be remote from any or all of the computers 1302, 1304, 1306, 1312, 1314, 1316, 1318, and/or in communication (e.g., via the network 1310) with one or more of these. In a particular set of embodiments, the database 1320 may reside in a storage-area network ("SAN") familiar to those skilled in the art. Similarly, any necessary files for performing the functions attributed to the computers 1302, 1304, 1306, 1312, 1314, 1316, 1318 may be stored locally on the respective computer and/or remotely, as appropriate. In one set of embodiments, the database 1320 may be a relational database, such as Oracle 10g, that is adapted to store, update, and retrieve data in response to SQL-formatted commands.

Figure 14:
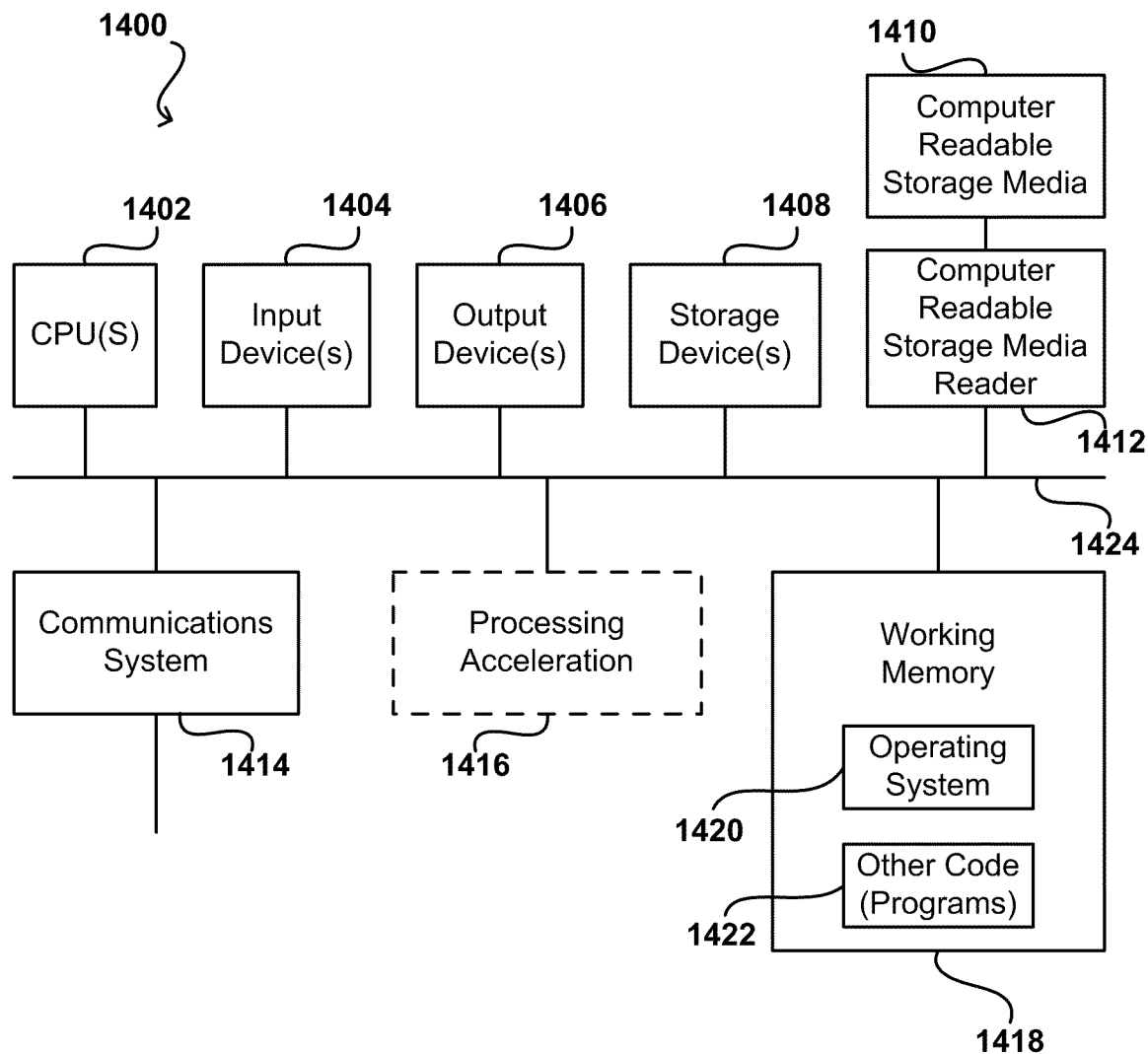
FIG. 14 illustrates components of a computerized device that can be used in accordance with one embodiment.

FIG. 14 illustrates an exemplary computer system 1400, in which various embodiments may be implemented. The system 1400 may be used to implement any of the computer systems described above. The computer system 1400 is shown comprising hardware elements that may be electrically coupled via a bus 1424. The hardware elements may include one or more central processing units (CPUs) 1402, one or more input devices 1404 (e.g., a mouse, a keyboard, etc.), and one or more output devices 1406 (e.g., a display device, a printer, etc.). The computer system 1400 may also include one or more storage devices 1408. By way of example, the storage device(s) 1408 can include devices such as disk drives, optical storage devices, solid-state storage device such as a random access memory ("RAM") and/or a read-only memory ("ROM"), which can be programmable, flash-updateable and/or the like.

The computer system 1400 may additionally include a computer-readable storage media reader 1412, a communications system 1414 (e.g., a modem, a network card (wireless or wired), an infra-red communication device, etc.), and working memory 1418, which may include RAM and ROM devices as described above. In some embodiments, the computer system 1400 may also include a processing acceleration unit 1416, which can include a digital signal processor DSP, a special-purpose processor, and/or the like.

The computer-readable storage media reader 1412 can further be connected to a computer-readable storage medium 1410, together (and, optionally, in combination with storage device(s) 1408) comprehensively representing remote, local, fixed, and/or removable storage devices plus storage media for temporarily and/or more permanently containing, storing, transmitting, and retrieving computer-readable information. The communications system 1414 may permit data to be exchanged with the network and/or any other computer described above with respect to the system 1400.

The computer system 1400 may also comprise software elements, shown as being currently located within a working memory 1418, including an operating system 1420 and/or other code 1422, such as an application program (which may be a client application, Web browser, mid-tier application, RDBMS, etc.). It should be appreciated that alternate embodiments of a computer system 1400 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for implementing telephony services, the method comprising:
    executing a first pre-defined service-level component on a processor of a server, the first pre-defined service-level component comprising a Service Oriented Architecture (SOA) service of a Service Delivery Platform (SDP) provided by the server to a plurality of users on two or more networks of different types, the first pre-defined service-level component comprising a reusable function for a telecommunications network application;
    executing a second pre-defined service-level component on the processor, the second pre-defined service-level component comprising a SOA service of the SDP and comprising a reusable function for the telecommunication network application;
    combining the pre-defined service-level components, using the processor, such that the pre-defined service-level components, when executed, provide a combined set of functions; and
    providing, by the processor through the SDP, the combined set of functions as telephony services on a network,
    wherein the pre-defined service-level components execute on the two or more networks through a a plurality of enablers, each of the plurality of enablers providing an abstraction of the underlying two or more networks through a common Application Program Interface (API), each of the plurality of enablers providing a different set of intrinsic functions accessible by the pre-defined service-level components through the common API, each of the plurality of enablers comprising two or more adapters, and each of the adapters specific to a technology of the two or more networks of different types.

2. The method of claim 1 wherein the telephony services are selected from the group consisting of legacy intelligent network services, new services, voice over internet protocol (VoIP) services, virtual private branch exchange services, and conferencing.

3. The method of claim 1 wherein the different sets of intrinsic functions provided by the plurality of enablers comprise two or more of call control functions, presence functions, messaging functions, charging functions, media server control functions, voice access functions, or resource management functions.

4. The method of claim 1 wherein the first pre-defined service-level component selects a network upon which the first pre-defined service-level component is executed.

5. The method of claim 1 wherein the pre-defined service-level components have been composed using Business Process Execution Language (BPEL).

6. A computer-readable memory having stored therein a sequence of instructions which, when executed by a processor cause the processor to implement telephony services by:
executing a first pre-defined service-level component on a processor of a server, the first pre-defined service-level component comprising a Service Oriented Architecture (SOA) service of a Service Delivery Platform (SDP) provided by the server to a plurality of users on two or more networks of different types, the first pre-defined service-level component comprising a reusable function for a telecommunications network application;
executing a second pre-defined service-level component on the processor, the second pre-defined service-level component comprising a SOA service of the SDP and comprising a reusable function for the telecommunication network application;
combining the pre-defined service-level components, using the processor, such that the pre-defined service-level components, when executed, provide a combined set of functions; and
providing, by the processor through the SDP, the combined set of functions as telephony services on a network,
wherein the pre-defined service-level components execute on the two or more networks through a a plurality of enablers, each of the plurality of enablers providing an abstraction of the underlying two or more networks through a common Application Program Interface (API), each of the plurality of enablers providing a different set of intrinsic functions accessible by the pre-defined service-level components through the common API, each of the plurality of enablers comprising two or more adapters, and each of the adapters specific to a technology of the two or more networks of different types.

7. The computer-readable memory device of claim 6 wherein the telephony services are selected from the group consisting of legacy intelligent network services, new services, voice over internet protocol (VoIP) services, virtual private branch exchange services, and conferencing.

8. The computer-readable memory device of claim 6 wherein the different sets of intrinsic functions provided by the plurality of enablers comprise two or more of call control functions, presence functions, messaging functions, charging functions, media server control functions, voice access functions, or resource management functions.

9. The computer-readable memory device of claim 6 wherein the first pre-defined service-level component selects a network upon which the first pre-defined service-level component is executed.

10. The computer-readable memory device of claim 6 wherein the pre-defined service-level components have been composed using Business Process Execution Language (BPEL).

11. A system comprising:
a processor; and
a memory coupled with the processor and having stored therein a sequence of instructions which, when executed by the processor cause the processor to implement telephony services by:
executing a first pre-defined service-level component, the first pre-defined service-level component comprising a Service Oriented Architecture (SOA) service of a Service Deliver Platform (SDP) provided by a server to a plurality of users on two or more networks of different types, the first pre-defined service-level component comprising a reusable function for a telecommunications network application,
executing a second pre-defined service-level component, the second pre-defined service-level component comprising a SOA service of the SDP and comprising a reusable function for the telecommunication network application,
combining the pre-defined service-level components such that the pre-defined service-level components, when executed, provide a combined set of functions, and
providing through the SDP the combined set of functions as telephony services on a network,
wherein the pre-defined service-level components execute on the two or more networks through a a plurality of enablers, each of the plurality of enablers providing an abstraction of the underlying two or more networks through a common Application Program Interface (API), each of the plurality of enablers providing a different set of intrinsic functions accessible by the pre-defined service-level components through the common API, each of the plurality of enablers comprising two or more adapters, and each of the adapters specific to a technology of the two or more networks of different types.

12. The system of claim 11 wherein the telephony services are selected from the group consisting of legacy intelligent network services, new services, voice over internet protocol (VoIP) services, virtual private branch exchange services, and conferencing.

13. The system of claim 11 wherein the different sets of intrinsic functions provided by the plurality of enablers comprise two or more of call control functions, presence functions, messaging functions, charging functions, media server control functions, voice access functions, or resource management functions.

14. The system of claim 11 wherein the first pre-defined service-level component selects a network upon which the first pre-defined service-level component is executed.

15. The system of claim 11 wherein the pre-defined service-level components have been composed using Business Process Execution Language (BPEL).

* * * * *

UNITED STATES PATENT AND TRADEMARK OFFICE
CERTIFICATE OF CORRECTION

| | |
|---|---|
| PATENT NO. | : 8,879,547 B2 |
| APPLICATION NO. | : 12/791129 |
| DATED | : November 4, 2014 |
| INVENTOR(S) | : Maes |

It is certified that error appears in the above-identified patent and that said Letters Patent is hereby corrected as shown below:

In the Specification

In column 2, line 54, delete "in on" and insert -- on --, therefor.

In column 9, line 30, delete "METADATA,"," and insert -- METADATA," --, therefor.

In column 14, line 62, delete "the the" and insert -- the --, therefor.

In the Claims

In column 18, line 43, in Claim 1, delete "a a" and insert -- a --, therefor.

In column 19, line 27, in Claim 6, delete "a a" and insert -- a --, therefor.

In column 20, line 27, in Claim 11, delete "a a" and insert -- a --, therefor.

Signed and Sealed this
Twenty-third Day of June, 2015

Michelle K. Lee
*Director of the United States Patent and Trademark Office*